United States Patent
Hum et al.

(10) Patent No.: US 7,111,128 B2
(45) Date of Patent: Sep. 19, 2006

(54) HIERARCHICAL VIRTUAL MODEL OF A CACHE HIERARCHY IN A MULTIPROCESSOR SYSTEM

(75) Inventors: Herbert H. J. Hum, Portland, OR (US); James R. Goodman, Madison, WI (US)

(73) Assignee: Intel Corporation, Santa Clara, CA (US)

(*) Notice: Subject to any disclaimer, the term of this patent is extended or adjusted under 35 U.S.C. 154(b) by 303 days.

(21) Appl. No.: 10/324,711

(22) Filed: Dec. 19, 2002

(65) Prior Publication Data

US 2004/0123045 A1    Jun. 24, 2004

(51) Int. Cl.
*G06F 12/00* (2006.01)

(52) U.S. Cl. .................. 711/141; 711/147; 711/148

(58) Field of Classification Search ........ 711/141–145, 711/147–148
See application file for complete search history.

(56) References Cited

U.S. PATENT DOCUMENTS

| | | | |
|---|---|---|---|
| 6,275,905 B1 | 8/2001 | Keller et al. | |
| 6,275,907 B1 * | 8/2001 | Baumgartner et al. | ...... 711/143 |
| 6,338,122 B1 * | 1/2002 | Baumgartner et al. | ...... 711/141 |
| 6,484,220 B1 * | 11/2002 | Alvarez et al. | ............... 710/46 |
| 6,769,017 B1 * | 7/2004 | Bhat et al. | ................... 709/214 |
| 6,874,053 B1 * | 3/2005 | Yasuda et al. | .............. 710/305 |
| 6,877,030 B1 * | 4/2005 | Deneroff | ..................... 709/213 |
| 6,901,485 B1 * | 5/2005 | Arimilli et al. | ............. 711/135 |

OTHER PUBLICATIONS

Jim Handy, "The Cache Memory Book," Second Edition, 1998, pp. vii-229, Academic Press Limited, London, United Kingdom.
"IEEE Standard for Scalable Coherent Interface (SCI)," IEEE Std 1596-1992, 1992, pp. i-243, Institute of Electrical and Electronics Engineers, Inc., USA.
"UltraSPARC User's Manual, UltraSPARC-I, UltraSPARC-II," Jul. 1997, pp. iii-394, Sun Microsystems, USA.

* cited by examiner

*Primary Examiner*—T Nguyen
(74) *Attorney, Agent, or Firm*—Michael J. Nesheiwat

(57) ABSTRACT

The cache coherency protocol described herein can be used to maintain a virtual model of a system, where the virtual model does not change as the system configuration changes. In general, the virtual model is based on the assumption that each node in the system can directly communicate with some number of other nodes in the system. In one embodiment, for each cache line, the address of the cache line is used to designate a node as the "home" node and all other nodes as "peer" nodes. The protocol specifies one set of messages for communication with the line's home node and another set of messages for communication with the line's peer nodes.

5 Claims, 19 Drawing Sheets

HIERARCHICAL VIRTUAL MODEL OF A CACHE HIERARCHY IN A MULTIPROCESSOR SYSTEM

RELATED APPLICATIONS

The present U.S. Patent application is related to the following U.S. Patent applications filed concurrently:

(1) application Ser. No. 10/325,069, filed Dec. 19, 2002, entitled "FORWARD STATE FOR USE IN CACHE COHERENCY IN A MULTI-NODE SYSTEM" now U.S. Pat. No. 6,922,756

(2) application Ser. No. 10/326,234, filed Dec. 19, 2002, entitled "HIERARCHICAL DIRECTORIES FOR CACHE COHERENCY IN A MULTIPROCESSOR SYSTEM"

(3) application Ser. No. 10/325,427, filed Dec. 19, 2002, entitled "SPECULATIVE DISTRIBUTED CONFLICT RESOLUTION FOR A CACHE COHERENCY PROTOCOL"

(4) application Ser. No. 10/326,232, filed Dec. 19, 2002, entitled "NON-SPECULATIVE DISTRIBUTED CONFLICT RESOLUTION FOR A CACHE COHERENCY PROTOCOL"

FIELD

The invention relates to cache memories. More particularly, the invention relates to a hierarchical model of cache memories in a multiprocessor system.

BACKGROUND

Current cache coherency protocols, for example, the MESI protocol, can be used to maintain cache coherency in single processor as well as multiprocessor (or multi-node) systems. However, in order to function properly, a non-bus-based multiprocessor system, e.g., a point-to-point interconnection of multiple processors, is configured to operate with a fixed number of processors or nodes. The maximum number of processors is known by a system designer prior to implementation of the system and the system is designed to support configurations up to that maximum number of nodes.

If a non-bus-based multiprocessor system is to be implemented using a greater number of processors than the maximum, the system must be redesigned. Processors cannot simply be added to the system because current cache coherency protocols specify required information whose size is dependent on the maximum number of nodes a system can have.

Because traditional cache coherency protocols are rigid and require specific designs up to a maximum configuration, these protocols increase the cost and complexity of providing systems with differing maximum numbers of processors and/or multiple configurations. For example, the IEEE Futurebus+architecture specifies a copy-back coherency protocol based on MESI and supports complex systems. FIG. 1 is a block diagram of a prior art Futurebus+architecture. The Futurebus+architecture is described in IEEE Standard 896.1 (published in 1994) and related documents.

Buses 15, 30 and 35 conform to the Futurebus+standard and are coupled to cache memories (e.g., 22, 24, 40, 45, 50, 55), to cache agents (e.g., 20, 26) or to memory agents (e.g., 21, 27). Memory agent 21 receives read and write commands from bus 30 and responds to the commands by operating with cache agent 20 as though the memory agent 21 were a main memory. Memory agent 21 tracks memory locations and cache memories 40 and 45, which are coupled to bus 30. Memory agent 27, cache agent 26, bus 35 and cache memories 50 and 55 operate in a similar manner.

Cache agent 20 provides an interface between memory agent 21 and bus 15 to provide bus snooping services for cache memories 40 and 45. Cache agent 26 operates similarly for cache memories 50 and 55. Processors 23, 25, 42, 47, 52 and 57 are coupled with cache memories 22, 24, 40, 40, 50 and 55, respectively. The processors interact with the cache memories in any manner known in the art.

Multiple levels of cache hierarchy can be provided in a similar manner with additional levels of buses and associated cache agents and memory agents. However, information fields in the cache coherency messages sent between the agents assume a fixed maximum number. This adds inefficiencies in message transmissions when the multiprocessor configuration is small relative to the maximum number. Moreover, the designers of the cache coherency protocol need to accommodate a maximum number of nodes in the system that may be larger than system designers would ever build.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Figure 1:
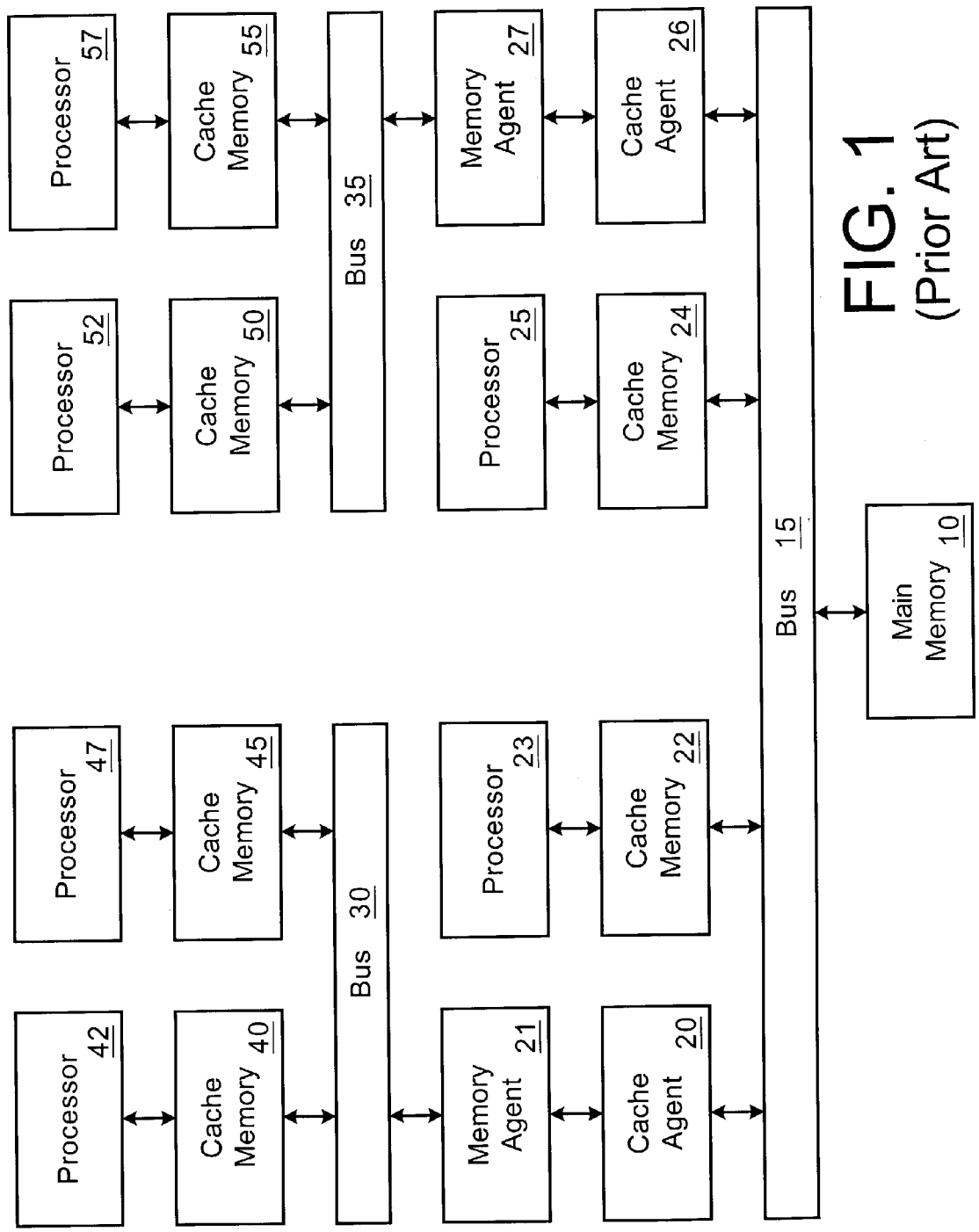
FIG. 1 is a block diagram of a prior art Futurebus+ architecture.

Techniques for use of a hierarchical virtual model of a cache hierarchy in a multiprocessor system are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The cache coherency protocol described herein can be used to maintain a virtual model of a system, where the virtual model does not change as the system configuration changes. In general, the virtual model is based on the assumption that each node in the system can directly communicate with some number of other nodes in the system. In one embodiment, for each cache line, the address of the cache line is used to designate a node as the "home" node and all other nodes as "peer" nodes. The protocol specifies one set of messages for communication with the line's home node and another set of messages for communication with the line's peer nodes.

The home/peer node abstraction can be used in a hierarchical manner to extend the model of the system. Each node interacts with other nodes based on the home/peer node abstraction, but a node can be multiple processors and/or caches represented by an "agent" that handles messages for the multiple processors and/or caches. The home node for a cache line can consist of a tree of nodes, but must include within the tree the actual home node for the cache line.

The cache coherency protocol appears the same for simple nodes (i.e., nodes that include a single processor and/or cache memory) and for agents that operate for clusters of processors and/or cache memories. Except for delays, the protocol operates in the same manner for simple nodes and for agents. Because of the hierarchical nature of the model, the number of node addresses required does not increase as the system grows. That is, the translation of messages entering and exiting a cluster of nodes is handled by the agent. Thus, the system size can be increased without the need for redesign of the system in general.

Request Messages

The following messages are requests for data/action from a requesting node. These messages are broadcast to all nodes of the system.

Port Read Line (PRL): This is a request for a copy of a data segment such as, for example, a cache line.

Port Read Invalidate Line (PRIL): This is a request for a copy of a data segment where the provider node's copy of the data is invalidated. This message can also be referred to as a "request for ownership."

Port Write Line (PWL): This message causes data (e.g., a modified cache line) to be written to memory. This message can also referred to as a "dirty eviction."

Response Messages

The following messages are messages sent from Peer (i.e., Non-Home) nodes to the Requesting node in response to requests described above.

Invalid State Acknowledgement (IACK): This message is a response to a request (PRL, PRIL, PWL) when the node sending the response has an invalid copy of the requested data or no copy of the requested data.

Shared State Acknowledgement (SACK): This message is a response to a request when the node sending the response has a copy of the requested data in the Shared state.

Acknowledgement of Data Received (DACK): This message acknowledges the receipt of requested data.

Conflict: This message indicates that there is a copending request for the requested cache line.

Data & State: This message provides the requested data as well as an indication of the state of the data in the Requesting node.

Messages to Home Node

These messages are transmitted to the Home node by a Peer node.

Read(Conflicts): This message requests data from the Home nodes and lists all conflicts, if any.

CNCL(Conflicts): This message is sent to the Home node in response to a hit in a Peer node and lists all conflicts, if any. This message cancels the Home node's prefetch operation.

Data(Conflicts): This message is used to write back data and lists all conflicts, if any.

Messages From the Home Node

These messages are sent from the Home node to the Peer and/or Requesting nodes.

Data: This message includes the requested data and can indicate the state of the data (M/E/F/S) to be used by the Requesting node.

Acknowledge (ACK): This message indicates that the requested data has been sent to the Requesting node.

Wait: This message causes the receiving node to pause before sending further messages.

Transfer (XFR): This message causes the receiving node to transfer data to the node indicated in the message.

Cache Protocol Overview

There are two basic schemes for providing cache coherence, snooping (now often called Symmetric MultiProcessing SMP) and directories (often called Distributed Shared Memory DSM). The fundamental difference has to do with placement and access to the meta-information, that is, the information about where copies of a cache line are stored.

For snooping caches the information is distributed with the cached copies themselves, that is, each valid copy of a cache line is held by a unit that must recognize its responsibility whenever any node requests permission to access the cache line in a new way. Someplace—usually at a fixed location—is a repository where the data is stored when it is uncached. This location may contain a valid copy even when the line is cached. However, the location of this node is generally unknown to requesting nodes—the requesting nodes simply broadcast the address of a requested cache line, along with permissions needed, and all nodes that might have a copy must respond to assure that consistency is maintained, with the node containing the uncached copy responding if no other (peer) node responds.

For directory-based schemes, in addition to a fixed place where the uncached data is stored, there is a fixed location, the directory, indicating where cached copies reside. In order to access a cache line in a new way, a node must communicate with the node containing the directory, which is usually the same node containing the uncached data repository, thus allowing the responding node to provide the data when the main storage copy is valid. Such a node is referred to as the Home node.

The directory may be distributed in two ways. First, main storage data (the uncached repository) is often distributed among nodes, with the directory distributed in the same way. Secondly, the meta-information itself may be distributed, keeping at the Home node as little information as whether the line is cached, and if so, where a single copy resides.

Snooping schemes rely on broadcast, because there is no single place where the meta-information is held, all nodes must be notified of each query, each node being responsible for doing its part to assure that coherence is maintained. This includes intervention messages, informing the Home node not to respond when another node is providing the data.

Snooping schemes have the advantage that responses can be direct and quick, but do not scale well because all nodes are required to observe all queries. Directory schemes are inherently more scalable, but require more complex responses, often involving three nodes in point-to-point communications.

Overview of the MESIF Protocol

The basic MESIF protocol described herein provides a snooping protocol without the limitations of a single, serializing bus. Like a snooping cache protocol, MESIF relies on nodes with cached copies of data to maintain coherence. The use of point-to-point links rather than a synchronous, centralized broadcast introduces the problem of time-warp—the fact that events appear to occur in a different order from the viewpoint of different nodes. The MESIF protocol correctly handles time-warp, recognizing when potential errors could result and making sure that they are handled correctly. The notion of a Home node is primarily to determine where the uncached copy reside, but the Home node can participate in every transaction—without being on the critical path—in order to resolve conflicts and time-warp issues. Because of the concurrent-broadcast nature of the scheme, MESIF achieves the low latency associated with snooping protocols, acquiring a cacheable copy of the data in most cases in the minimum possible latency: a single roundtrip request-response.

Ignoring for the time-warp problem, it is possible to achieve two-hop accesses when there is a unique cached copy in the system. Use of the F-state extends this capability to the common case where multiple copies exist.

The basic MESIF protocol is scalable, but the number of point-to-point connections a node requires grows with the number of nodes involved. The management of the growth of the nodes is accomplished hierarchically, by maintaining the appearance of a small collection of nodes, one of which is "the Home Node." For every address, each node is aware of such a collection of nodes—called its local cluster—with which it communicates, one of which is referred to as the Home Node. All other nodes in the cluster are referred to as Peer Nodes. For a given address, if a node contains the main storage for that address, it is referred to as the Home Node.

The MESIF protocol can be extended by defining the concept of a node recursively. That is, a node may contain one or more caches as well as some amount of main memory, but may also contain one or more nodes or clusters. A node appears as a single entity to other nodes through the mechanism of an agent, which has the same interface as any other node. That is, the agent may be seen by other nodes in its cluster as either a Peer Node or as the Home Node. If a compound node includes a node that is the Home Node, the compound node is referred to as the Home Node. Otherwise it is a Peer Node. Note that for a given address, because of the implicit hierarchy in the definition, multiple nodes may appear as "the Home Node," though only one node will appear as the Home node to any other node. Thus, the protocol is such that it is possible to ignore the distinction between agents and nodes, since both behave in the same way in the basic protocol.

The MESIF protocol involves broadcasting an initial request to all peer nodes as well as the Home Node. If a copy is cached in state E, F, or M, it is included in the response. A second message is then sent to the Home node, informing the Home Node that the request has been satisfied. If the requested line is uncached, or if only S-state copies exist, the second request sent to the Home node is used to confirm the previous request, which the Home node may have by now fetched from its memory. In either case, the Home node must respond to the second request (and to the first, though they can sometimes be combined) for purposes of synchronization and conflict resolution. Note that the Home node may have one or more caches, so it may respond to the initial request just like any other node.

Conceptually, requests emanate from the root of a tree. Requests are propagated down the tree and responses are collected and returned back up the tree. Unless the requesting node is the Home node, one of the leaf nodes is the Home node, and each of its parents, going up the tree appears as the Home node to nodes above it. Thus each leaf node responds as in the case of simple MESIF. Non-leaf nodes are agents for nodes below them. Thus a simple request/response involves the root sending requests to all its children (one of which is Home) and getting a response from each of them. Each of the children that are agents respond only after broadcasting to their subtree and collecting the responses.

Note that each node can see a different topology, with itself as the root of a tree. The topology for a given node is the same for all addresses, except that different child nodes will be the Home node for different addresses.

In one embodiment, the interconnection topology is a banyon network, that is, there is a unique designated path for communication between every pair of nodes in the system. Thus every node communicates with a set of other nodes, one of which appears to be the Home node (unless the node itself is the Home node). For routing purposes, each node operates as the root of a tree, with all the nodes it can communicate with being its children. If any of the child nodes are in fact agents, then they are not leaf nodes, but rather have an additional collection of nodes beneath them, and are a bridge to another cluster or group of clusters.

The response of an agent reflects the collective coherence data for the subtree for which it is the root. The agent can respond by broadcasting to the subtree, or it can retain information so that, for some requests, it can respond directly without having to broadcast to the subtree and collect the responses.

In one embodiment, the agent maintains usage information about all cache lines for which Home is outside the cluster. That is, the agent tracks lines that have been imported into the local cluster and are currently cached locally. The agent can track this information because all requests from within the cluster for these cache lines are routed through the agent if not handled within the cluster. Thus the cluster might have multiple copies of a cache line outstanding.

The Import Cache can also avoid broadcasting requests from elsewhere in the system to the agent's local cluster. The agent can use the import cache to determine that no nodes within the cluster have a copy of the cache line, the agent can respond with a NACK to a PRIL arriving from outside the cluster. Nodes can silently evict shared copies of a cache line, so the agent may not be aware that all copies have been evicted. Without loss of correctness, however, the agent broadcasts when the agent must invalidate any line not cached anywhere in the node. To avoid constant broadcasts of cache lines not cached locally, the agent may keep track of lines that are frequently written (causing invalidations) in other clusters so that the agent can short-circuit broadcasting to its local cluster.

In one embodiment, the agent maintains directory information about all cache lines for which Home is inside the cluster, but which have been cached outside the cluster. By maintaining complete information (for example, using a sparse cache directory), the agent can differentiate local requests that require broadcast outside the cluster. If an agent can determine that a line is not cached outside the Home cluster, the agent can respond with a NACK, avoiding the multiple broadcasts and long delay necessary before the agent can ascertain directly that no external cached copies exist. The Export Directory may also keep information about which nodes in its external cluster might have previously requested copies, and eliminate broadcast requests to nodes (clusters) that do not have a copy.

The Export Directory can also maintain a cached copy of line for which the Home node is within its local cluster. Thus the agent can respond to a PRL directly, supplying the data without broadcasting the request within the local cluster. Note that, like the Home node, the agent does not respond to a PRL if there is the possibility that another cluster might have the node in state E, F, or M.

Hierarchical System Overview

The cache coherency protocol described herein can be used to maintain a virtual model of a system, where the virtual model does not change as the system configuration changes. In general, the virtual model is based on the assumption that each node in the system can directly communicate with some number of other nodes in the system. In one embodiment, for each cache line, the address of the cache line is used to designate a node as the "home" node and all other nodes as "peer" nodes. The protocol specifies one set of messages for communication with the line's home node and another set of messages for communication with the line's peer nodes.

The home/peer node abstraction can be used in a hierarchical manner to extend the model of the system. Each node interacts with other nodes based on the home/peer node abstraction, but a node can be multiple processors and/or caches represented by an "agent" that handles messages for the multiple processors and/or caches. The home node for a cache line can consist of a tree of nodes, but must include within the tree the actual home node for the cache line.

The cache coherency protocol appears the same for simple nodes (i.e., nodes that include a single processor and/or cache memory) and for agents that operate for clusters of processors and/or cache memories. Except for delays, the protocol operates in the same manner for simple nodes and for agents. Because of the hierarchical nature of the model, the number of node addresses required does not increase as the system grows. Thus, the system size can be increased without the need for redesign of the system in general.

EXAMPLE TRANSACTION FLOWS IN HIERARCHICAL MESIF

FIGS. 2a through 2d are conceptual illustrations of a "Request for Ownership" type message for locally cached data having a local home node in a multi-node system having a hierarchical virtual model of a cache system. Other types of messages can be processed in a similar manner. In FIGS. 2a through 2h, cluster 100 includes peer nodes 110, 120 and 130, home node 140, home agent 160 and peer agent 170. In general, a node can be any combination of elements, at least one of which is a cache memory. While cluster 100 is illustrated with three peer nodes, any number of peer nodes can be supported in a cluster.

Prior to peer node 110 requesting data, peer nodes 110 and 130 have invalid copies, or no copy, of the data to be requested, which is designated by "DATA-I". Peer node 120 stores a modified copy of the data to be requested, which is designated by "DATA-M". Home node 140 serves as the home node for the data to be requested, which means that node 140 is associated with non-cache memory (e.g., main memory) in which the data to be requested is stored when not cached. For example, home node 140 can be a processor, cache memory and random access memory (RAM), where the RAM provides a non-cached storage location for the data.

As described in greater detail below, home agent 160 and peer agent 170 operate as agents for a group of nodes. Another embodiment may combine the functionality of the home and peer agents into a single agent. Yet another embodiment may merge the functionalities of the home and peer agent into a node within the cluster. In the example of FIGS. 2a through 2h, peer node 110 requests a copy of data. The data can be a block of data of any size. In one embodiment, the requested data is a cache line; however, any block size can be supported.

Figure 2A:
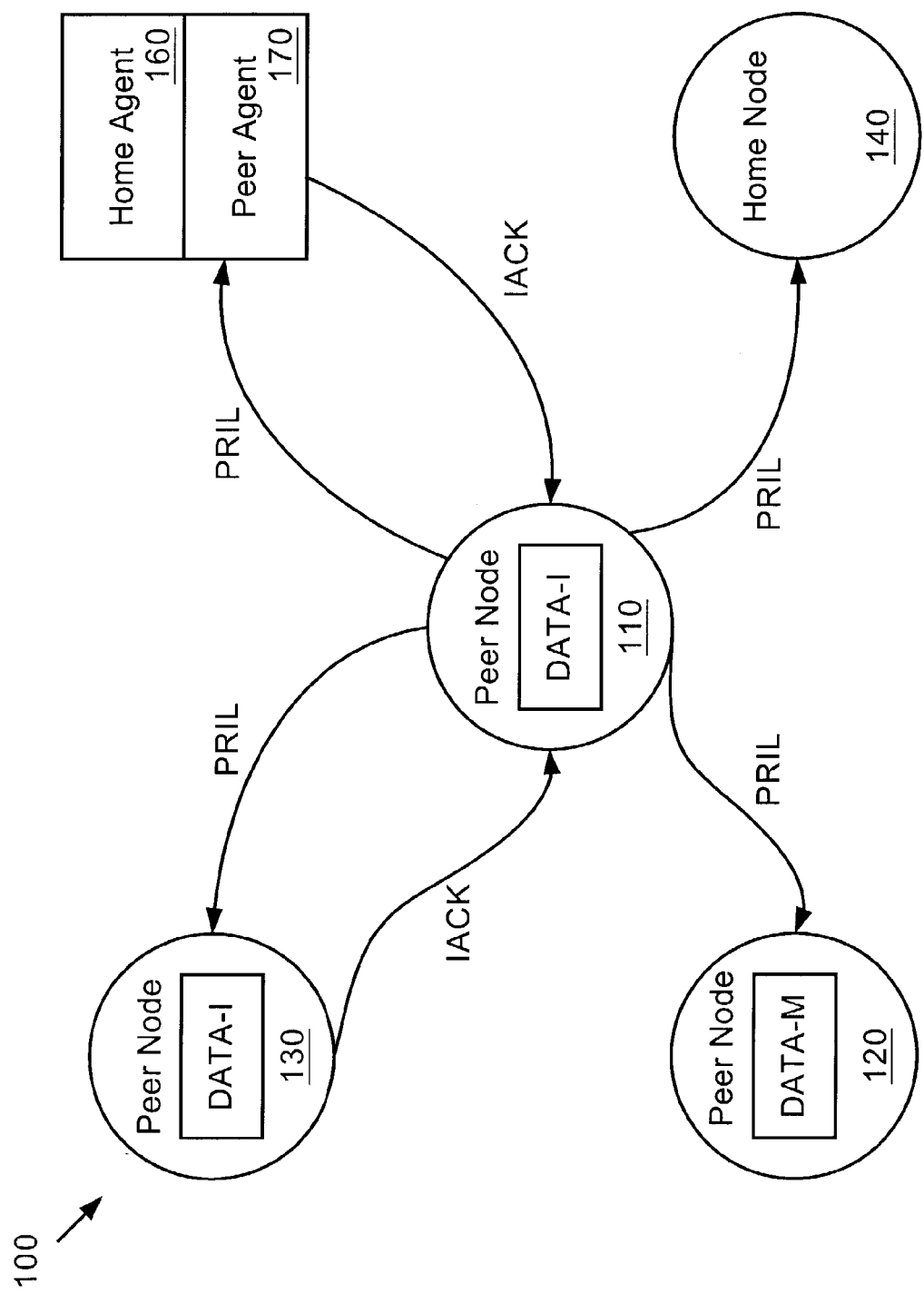
FIGS. 2a through 2d are conceptual illustrations of a "Request for Ownership" type message for locally cached data having a local home node in a multi-node system having a hierarchical virtual model of a cache system.

As illustrated in FIG. 2a, peer node 110 broadcasts a PRIL message to the remaining nodes of cluster 100 (i.e., peer nodes 120 and 130) and home node 140 as well as to peer agent 170. The PRIL message from peer node 110 is transmitted to peer agent 170 rather than home agent 160 because home node 140 is the home for the requested data. In one embodiment, the home node for a block of data is determined by the non-cache memory address corresponding to the requested block of data. Each node that operates as a home node does so for a predetermined set of addresses.

In one embodiment, a PRIL, or similar request, message causes home node 140 to begin the retrieval process of reading the requested data from memory. As described in greater detail below, this retrieval message can be aborted prior to completion.

Peer agent 170 and peer node 130 respond to the PRIL message with an IACK message. The IACK messages indicate that the sending node/agent does not have a valid copy of the requested data. In the example of FIGS. 2a through 2d, dashed lines represent messages previously sent and solid lines represent messages being described. In order to keep the figures more clear, when a set of messages (e.g., PRIL and corresponding IACK) are resolved, the lines representing the messages are no longer included in the figures.

Figure 2B:
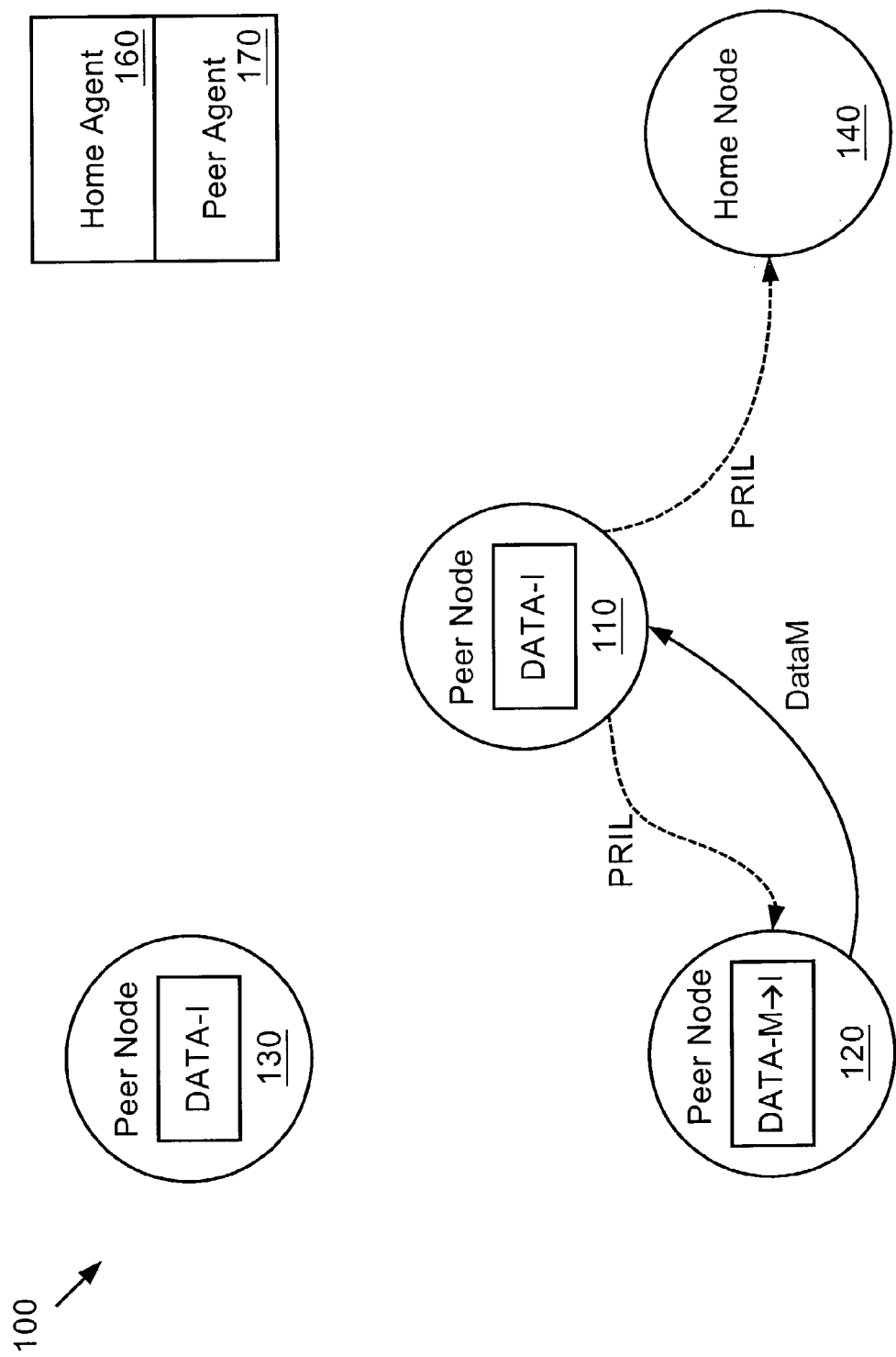

In FIG. 2b, peer node 120 sends a DataM message to peer node 110. The DataM message communicates the requested data to peer node 110 and indicates to peer node 110 that the requested data should be stored in the Modified (M) state. Also, peer node 120 transitions the copy of the data retained from the M state to the Invalid (I) state.

Figure 2C:
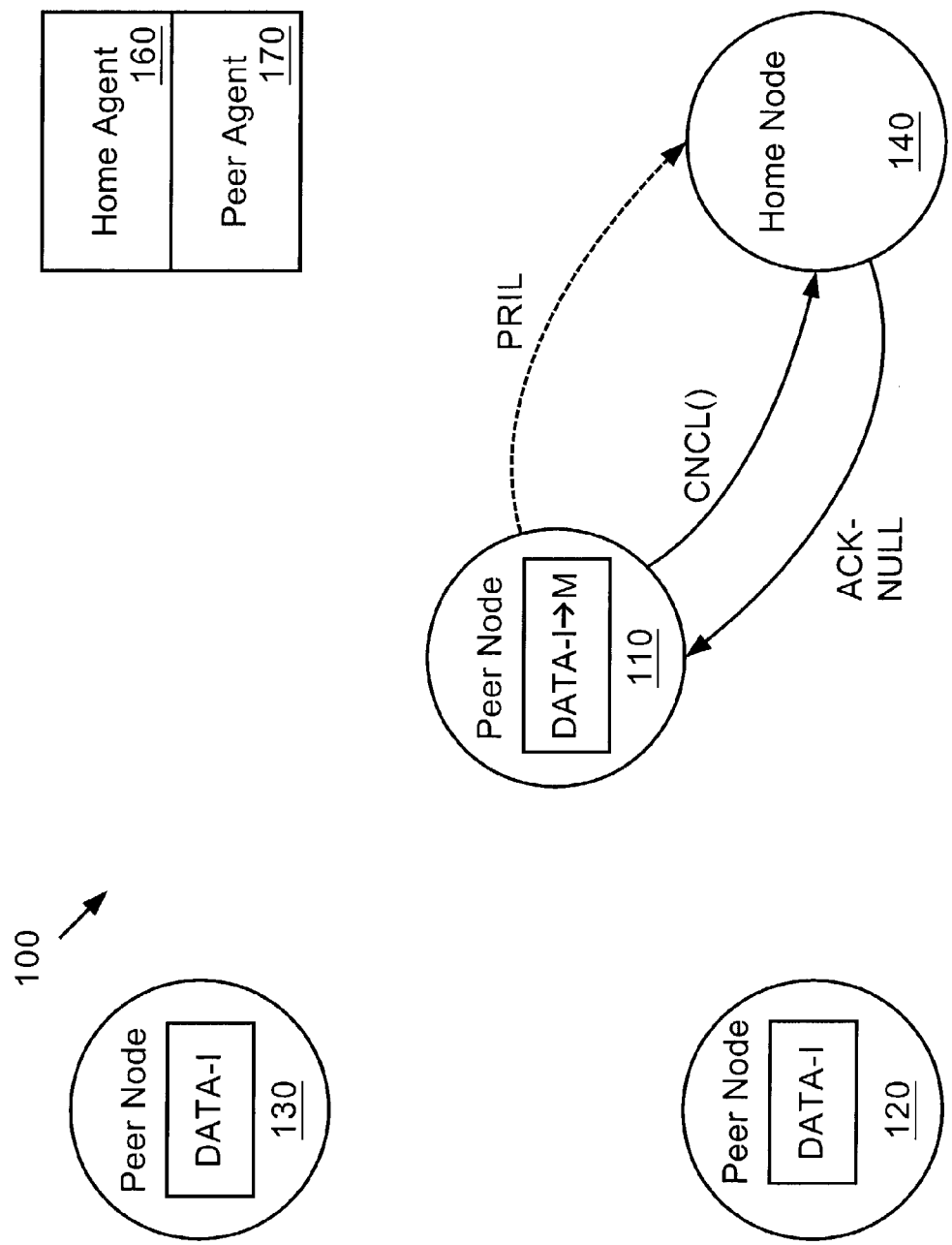

As illustrated in FIG. 2c, upon receiving the requested data peer node 110 stores the data in the M state and sends a CNCL( ) message to home node 140. The CNCL( ) message causes home node 140 to abort a read process to memory that was initiated in response to the original PRIL message. Home node 140 sends an ACK message to peer node 110 to indicate that the read request has been canceled, that no data has been retrieved, and indicates that peer node 110 has not identified any conflicts with the PRIL message.

Figure 2D:
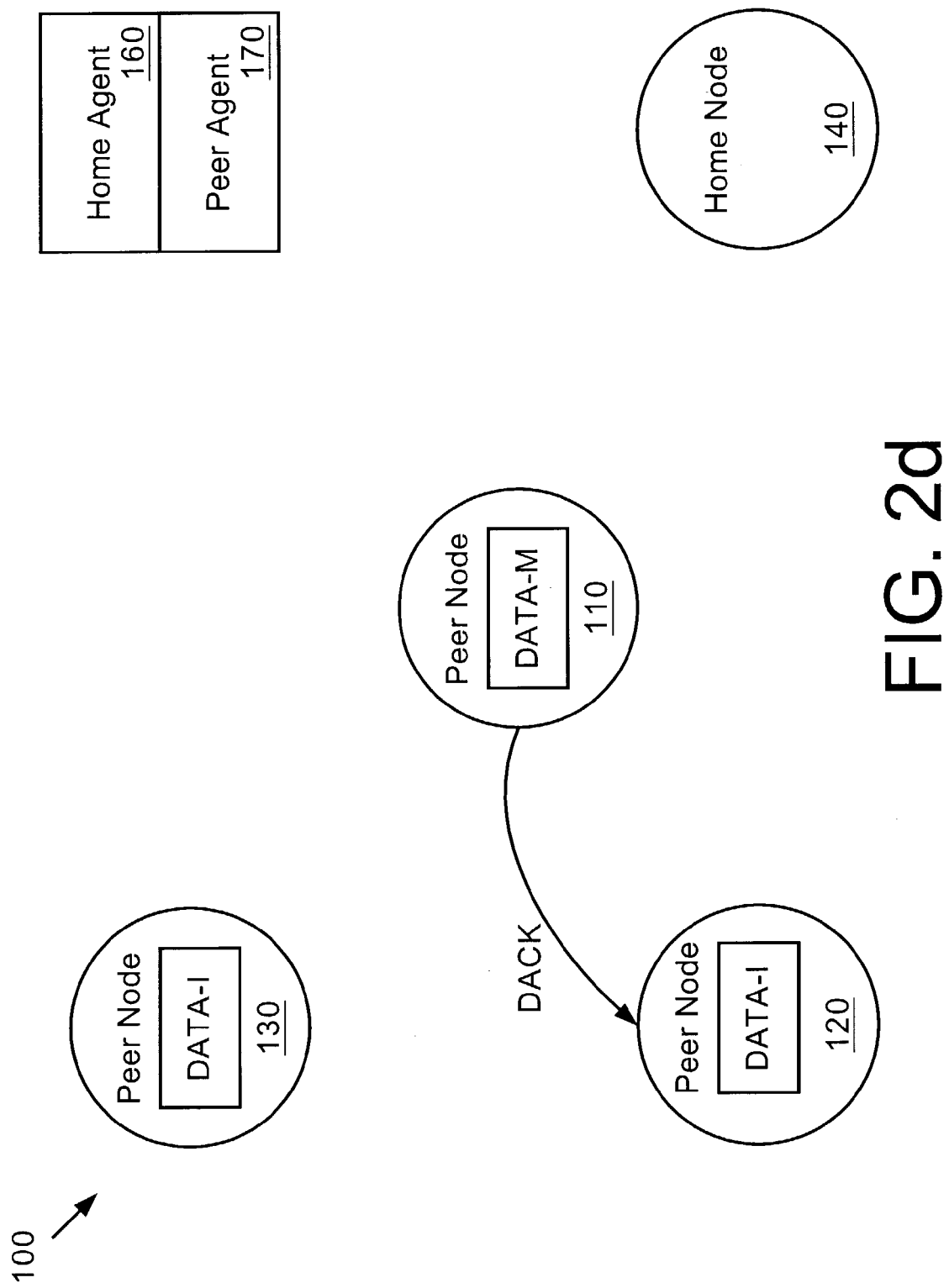

As illustrated in FIG. 2d, peer node 110 then sends a DACK message to peer node 120 to acknowledge receipt of the data from peer node 120. At the conclusion of the processing of the messages described with respect to FIGS. 2a through 2d, peer node 110 stores a copy of the requested data in the M state while peer nodes 120 and 130 store copies of the requested data in the I state, or not at all.

Figure 3A:
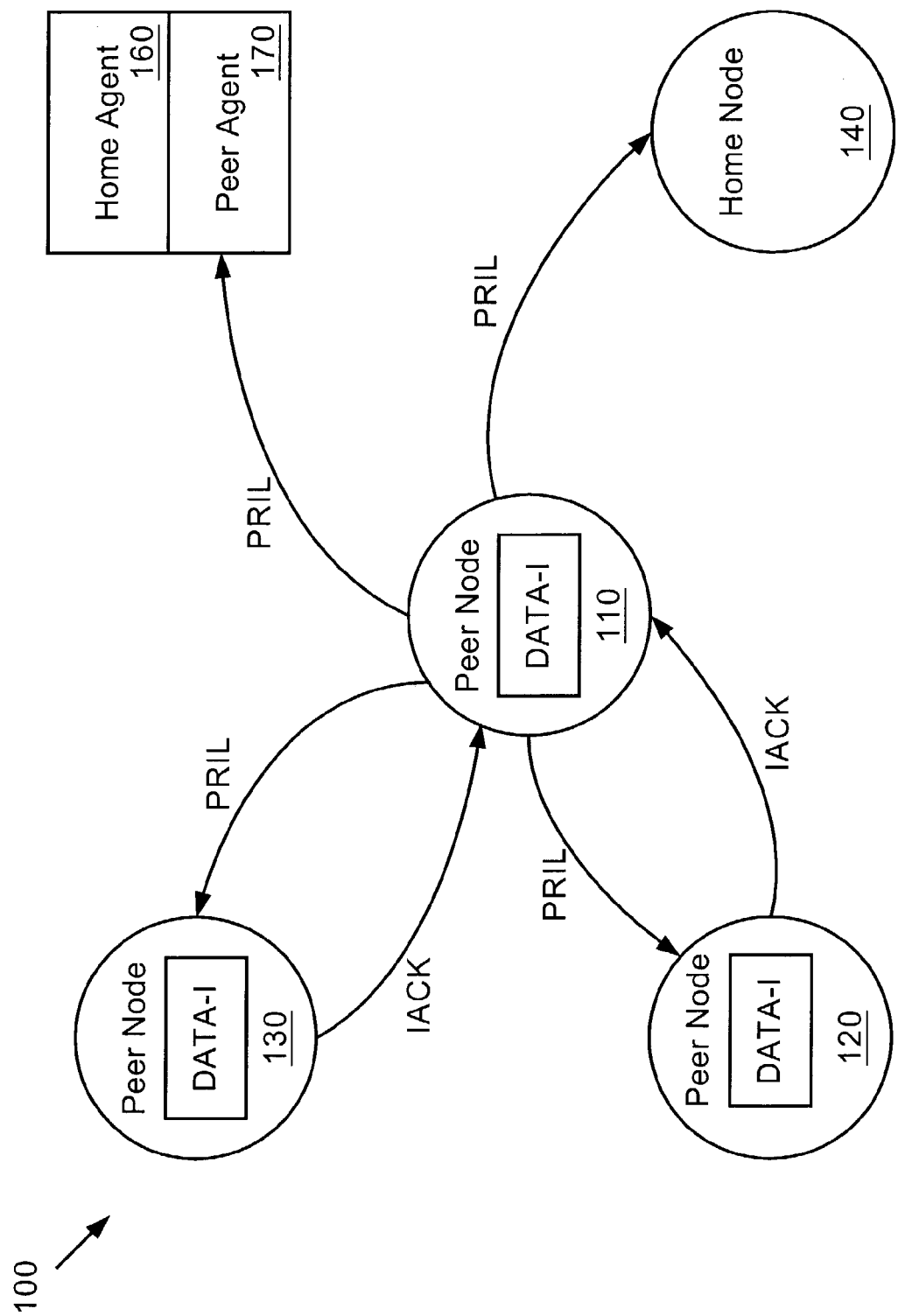
FIGS. 3a through 3d are conceptual illustrations of a "Request for Ownership" type message for remotely cached data having a local home node in a multi-node system having a hierarchical virtual model of a cache system.

FIGS. 3a through 3d are conceptual illustrations of a "Request for Ownership" type message for remotely cached data having a local home node in a multi-node system having a hierarchical virtual model of a cache system. The initial state of cluster 100 is illustrated in FIG. 3a in which peer nodes 110, 120 and 130 either store the data to be requested in the I state, that is they do not store a copy of the data to be requested. Peer node 110 broadcasts a PRIL message in order to request a copy of the designated data. In one embodiment, the PRIL message is transmitted to peer nodes 120 and 130, home node 140 and peer agent 170. Peer nodes 120 and 130 respond to the PRIL message with an IACK message. The IACK messages indicate that the sending node does not have a valid copy of the requested data.

Figure 3B:
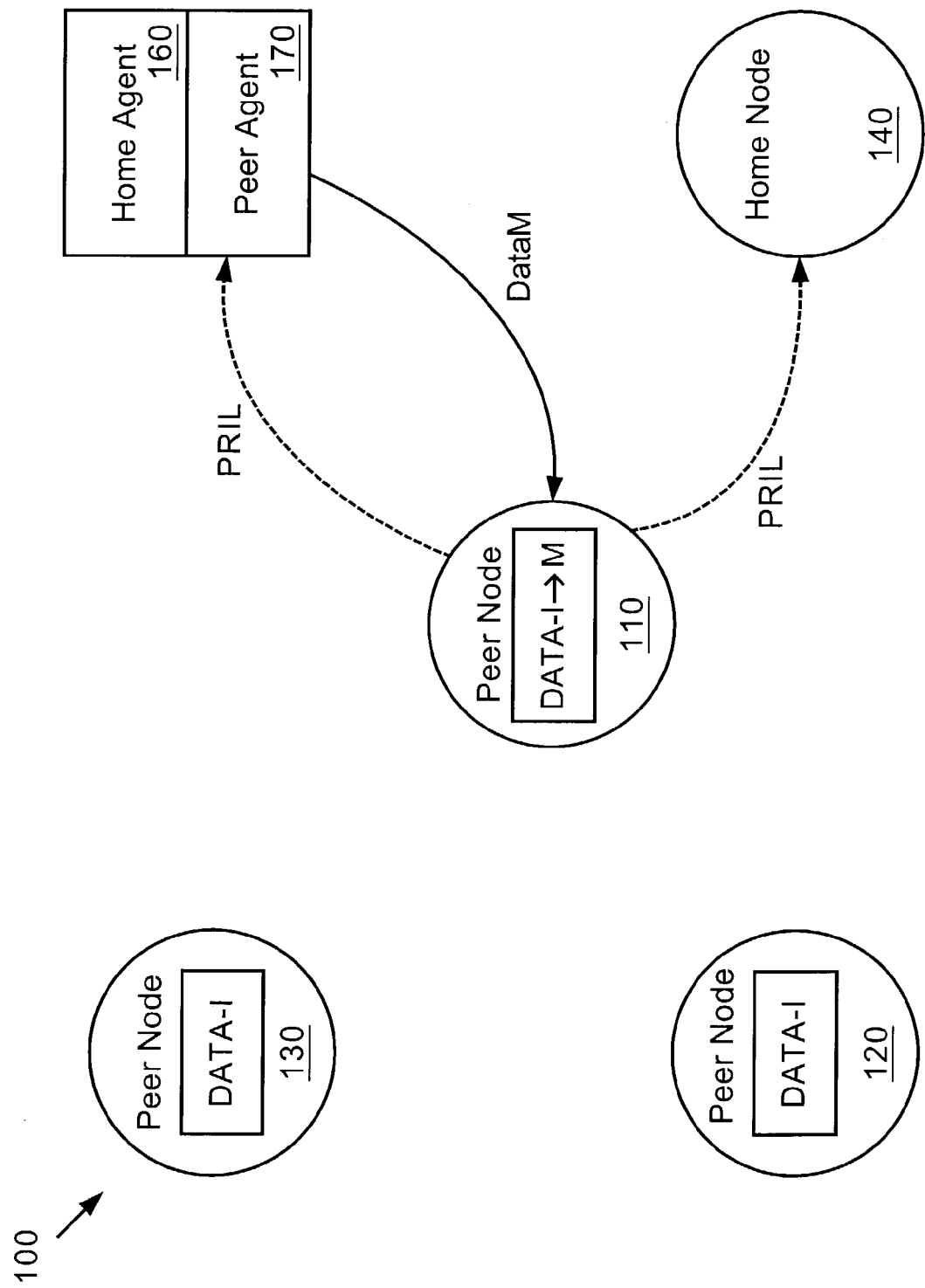

As illustrated in FIG. 3b, peer agent 170 returns a DataM message that carries the requested data and indicates to peer node 110 that the data should be stored in the M state. The data provided via peer agent 170 can be obtained from any node outside of cluster 100. The relationship between the nodes of cluster 100 and nodes outside of cluster 100 is described in greater detail below.

Figure 3C:
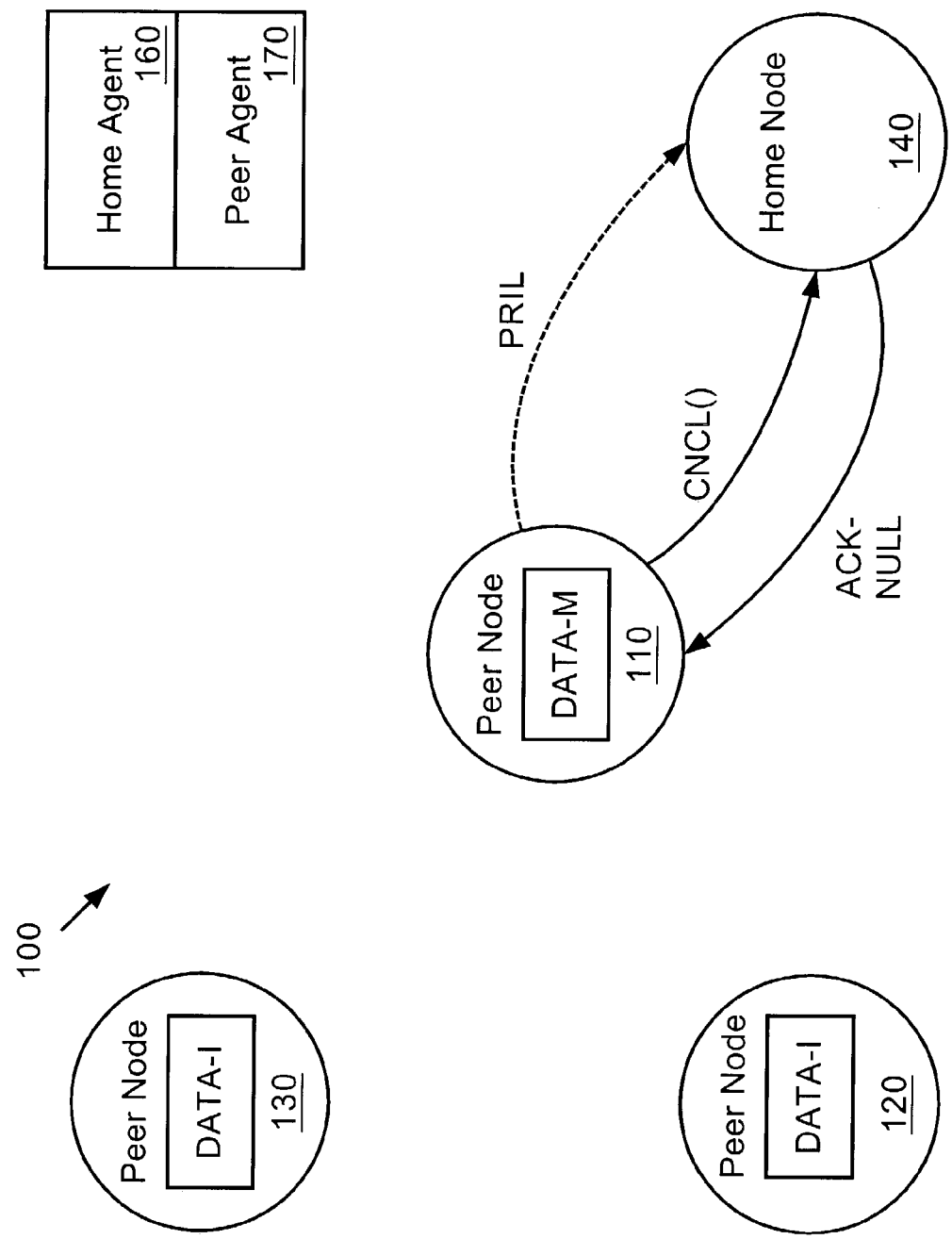

As illustrated in FIG. 3c, peer node 110 transmits a CNCL( ) message to 140 in response to receiving the DataM message from peer agent 170. As described above, the CNCL( ) message causes home node 140 to halt memory read operations initiated in response to the PRIL message. The CNCL( ) message also indicates to home node 140 that peer node 110 has identified no conflicts with the PRIL message. Home node 140 responds to the PRIL and the CNCL( ) messages with an ACK message to peer node 110. The ACK message acknowledges the CNCL( ) message and provides no data because the requested data was provided by peer agent 170.

Figure 3D:
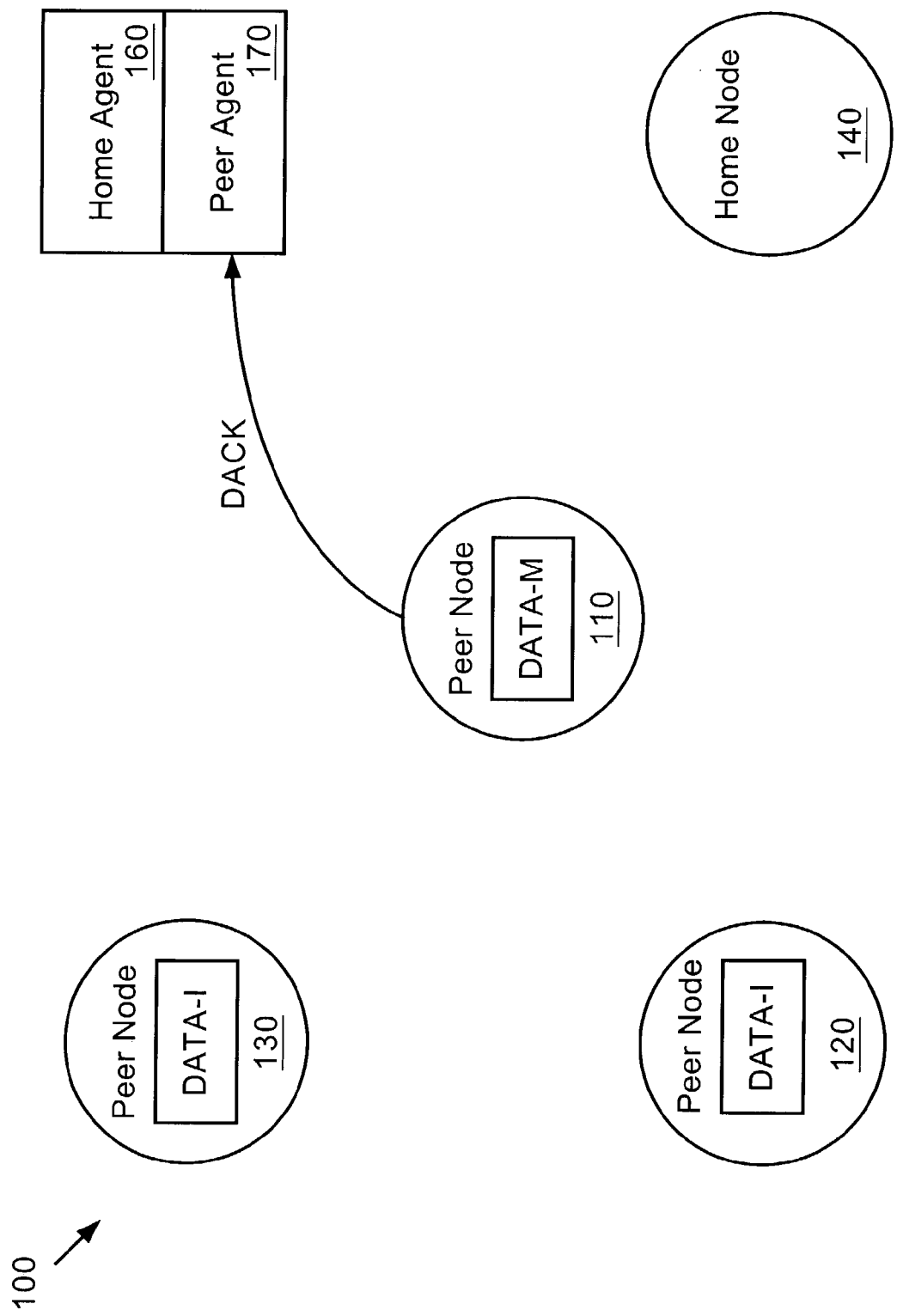

As illustrated in FIG. 3d, peer node 110 sends a DACK message to peer agent 170. The DACK message acknowledges receipt of the DataM message containing the requested data from peer agent 170.

Figure 4A:
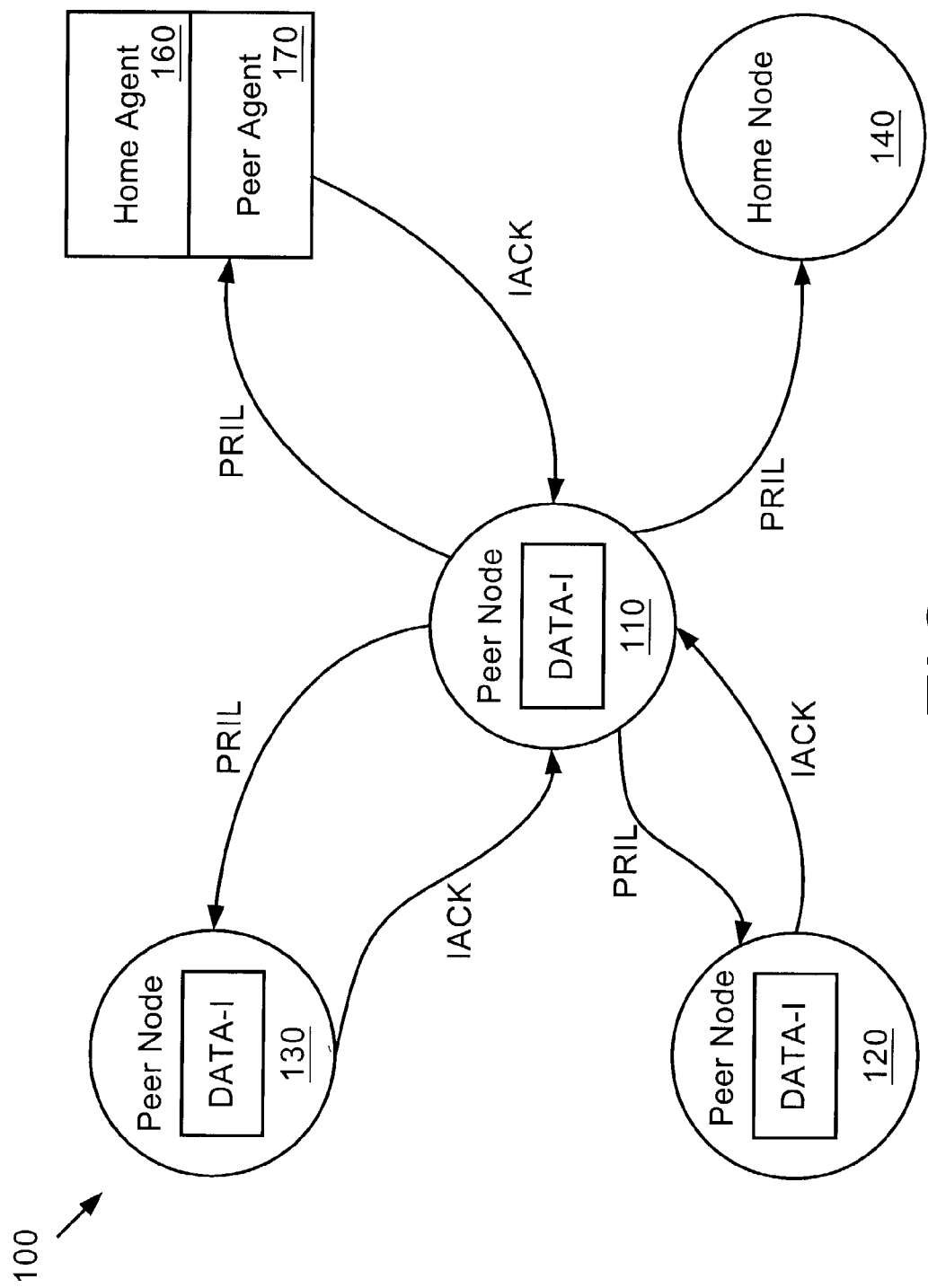
FIGS. 4a through 4b are conceptual illustrations of a "Request for Ownership" type message for uncached data having a local home node in a multi-node system having a hierarchical virtual model of a cache system.
Figure 4B:
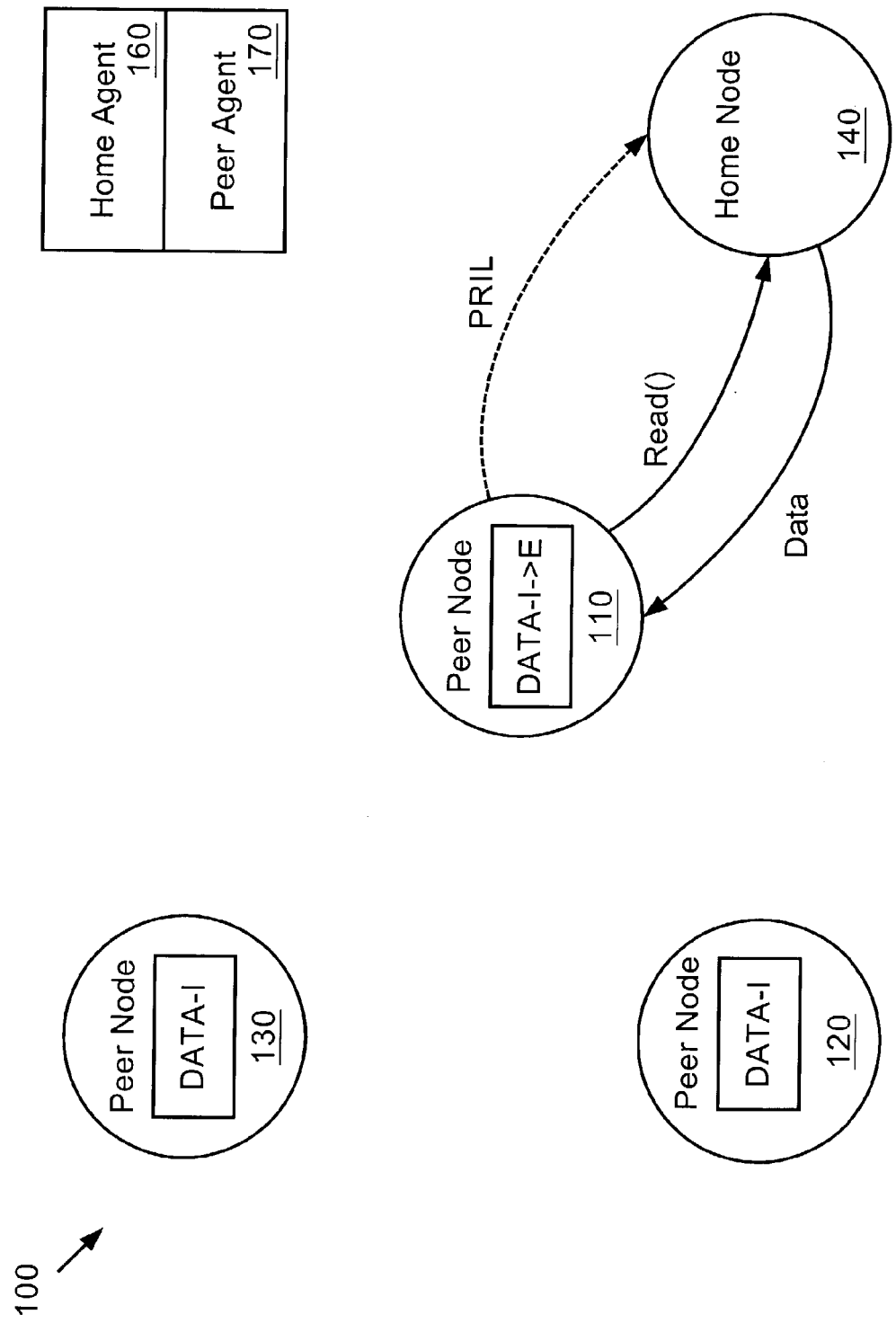

FIGS. 4a and 4b are conceptual illustrations of a "Request for Ownership" type message for uncached data having a local home node in a multi-node system having a hierarchical virtual model of a cache system. The initial state of cluster 100 is illustrated in FIG. 4a in which peer nodes 110, 120 and 130 do not store a copy of the data to be requested.

Peer node 110 broadcasts a PRIL message in order to request a copy of the designated data. In one embodiment, the PRIL message is transmitted to peer nodes 120 and 130, home node 140 and peer agent 170. Peer nodes 120 and 130 and peer agent 170 respond to the PRIL message with an IACK message. Because all peer nodes/agents have responded with IACK messages, peer node 110 can determine that the requested data is not cached and that the requested data must be retrieved from memory associated with home node 140.

As illustrated in FIG. 4b, peer node 110 issues a Read( ) message to home node 140. In one embodiment, the PRIL message initiates a read request for the requested data. The Read( ) message causes home node 140 to transmit the data to peer node 110 when the data is retrieved. The Read( ) message also indicates to home node 140 that peer node 110 has not identified any conflicts with the PRIL message. In an alternate embodiment, the Read( ) message can initiate the read request at home node 140.

When home node 140 has retrieved the requested data, the requested data is transmitted to peer node 110 with a Data message. When peer node 110 receives the data from home node 140, peer node 110 stores the requested data in cache memory in the Exclusive (E) state.

Figure 5A:
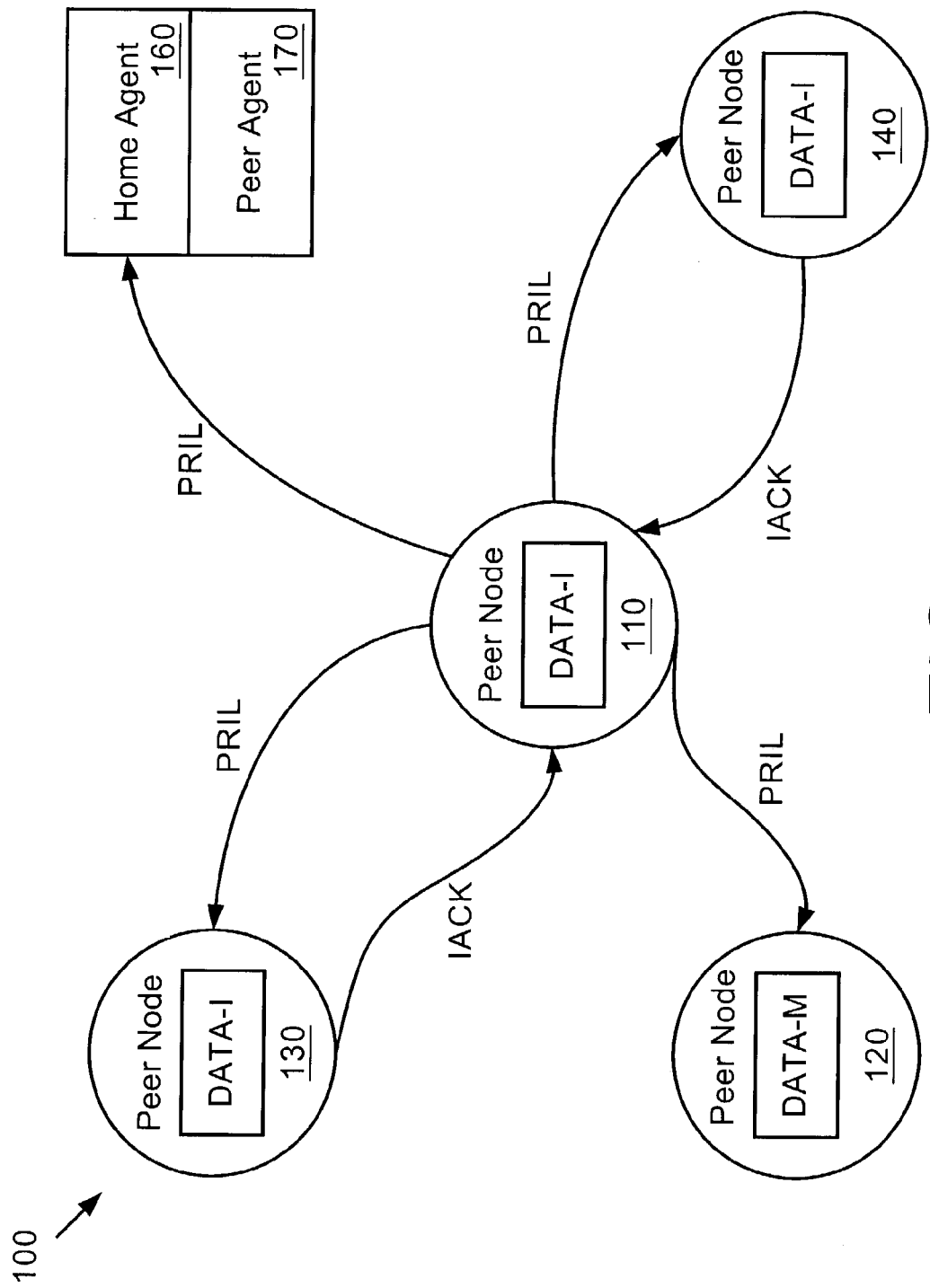
FIGS. 5a through 5d are conceptual illustrations of a "Request for Ownership" type message for locally cached data having a remote home node in a multi-node system having a hierarchical virtual model of a cache system.

FIGS. 5a through 5d are conceptual illustrations of a "Request for Ownership" type message for locally cached data having a remote home node in a multi-node system having a hierarchical virtual model of a cache system. Because the home node for the data to be requested is remote with respect to cluster 100, node 140 is a peer node rather than a home node as described above. As illustrated in FIG. 5a, peer node 120 stores a copy of the data to be requested in the M state while peer nodes 110, 130 and 140 does not store a copy of the data to be requested, that is, it is in the I state.

Peer node 110 broadcasts a PRIL message to peer nodes 120, 130 and 140. Peer node 110 also broadcasts a PRIL message to home agent 160. The PRIL message is transmitted to home agent 160 rather than peer agent 170 because the home node for the requested data is remote from cluster 100. Peer nodes 130 and 140 transmit IACK messages to peer node 110 in response to the PRIL messages.

Figure 5B:
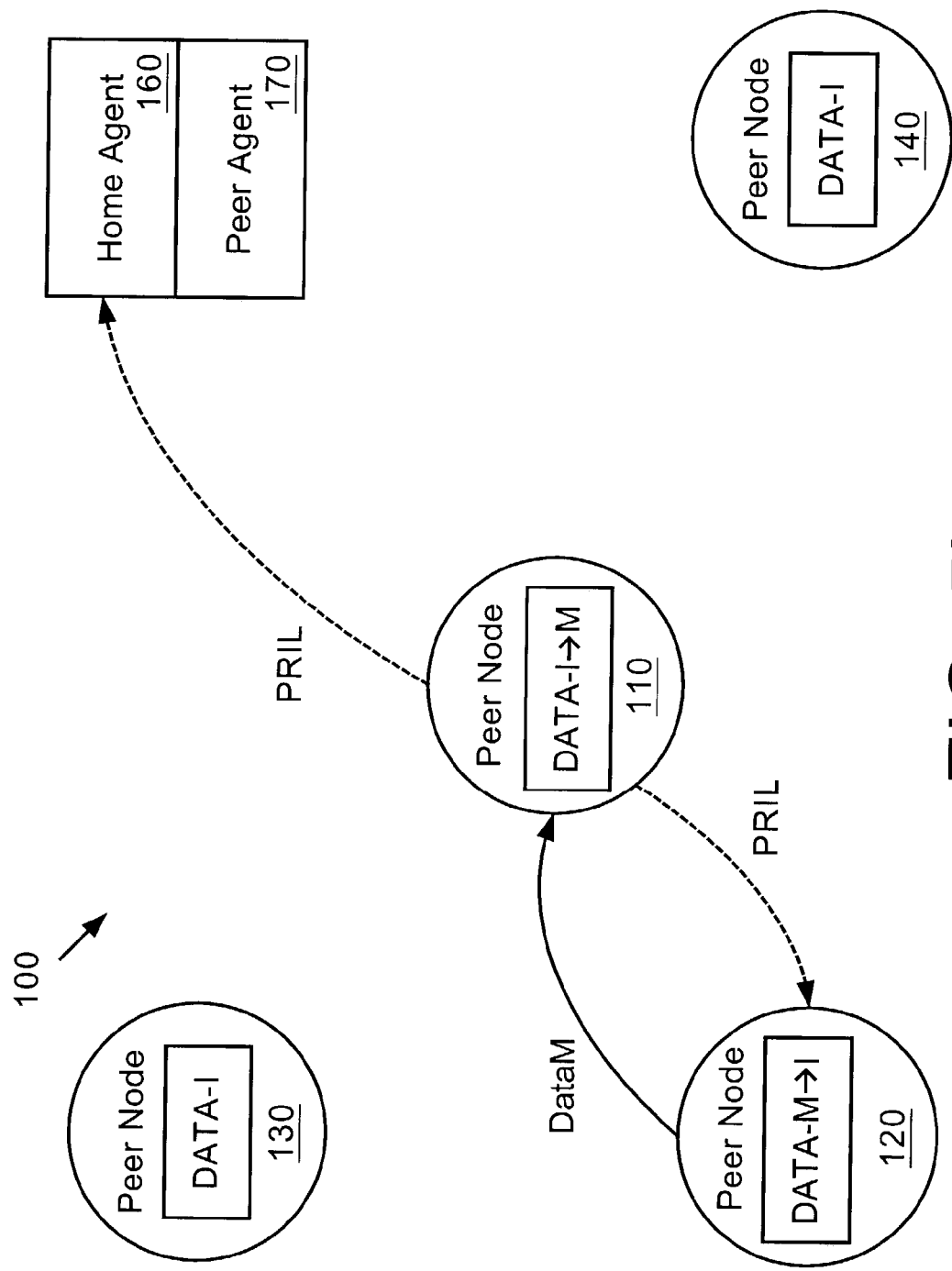

As illustrated in FIG. 5b, peer node 120 provides the data to peer node with a DataM message. Peer node 120 also transitions the copy of the data maintained in its cache memory from the M state to the I state.

Figure 5C:
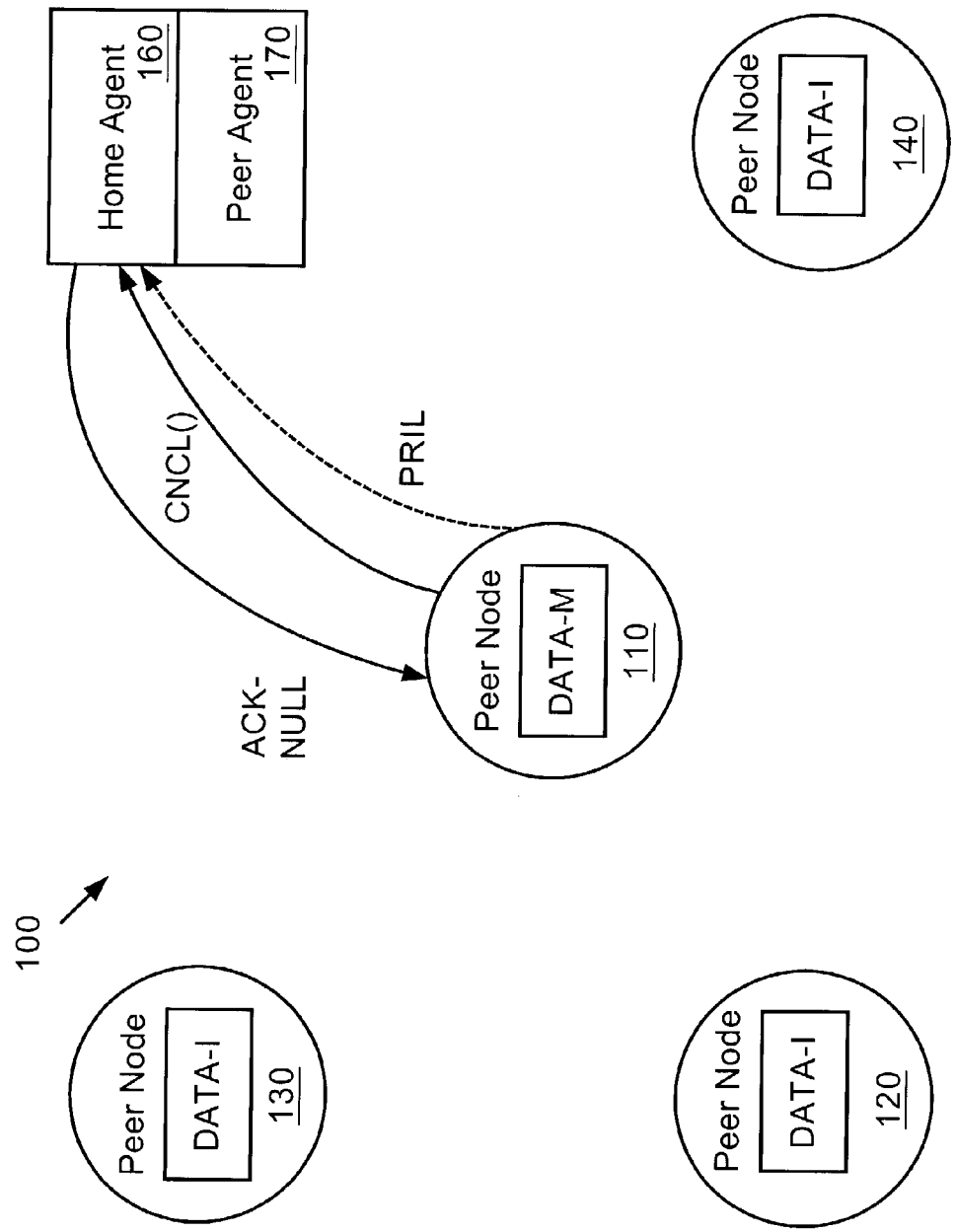

In FIG. 5c, peer node 110 sends a CNCL( ) message to home agent 160, which can be used to halt a memory read operation at the remote home node (not shown in FIG. 5c) for the requested data. Home agent 160 directs the CNCL( ) message to the appropriate node (not shown in FIG. 5c), which responds with an ACK message (not shown in FIG. 5c). Home agent 160 forwards the ACK message to peer node 110.

Figure 5D:
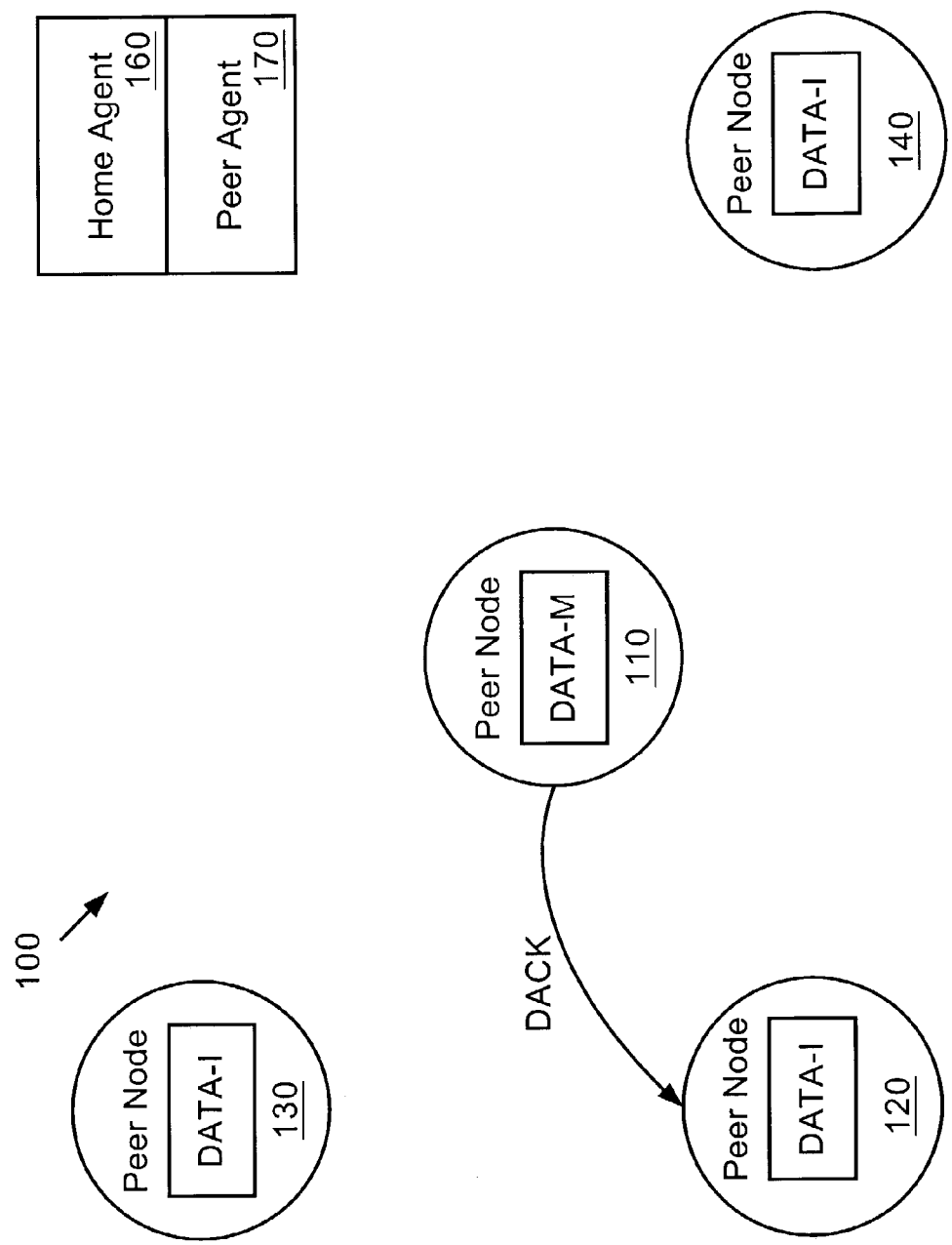

As illustrated in FIG. 5d, peer node 110 sends a DACK message to peer node 120. The DACK message acknowledges receipt of the requested data from peer node 120. Peer nodes 120, 130 and 140 do not have a copy of the data and peer node 110 stores a copy of the data in the M state.

Note that in requesting data having a remote home node, peer node 110 interacts with home agent 160 in the same manner as peer node would interact with a local home node, which is illustrated in FIGS. 2a through 2d. Because the interaction is the same for local home nodes and for remote home nodes and the number of remote nodes is masked by home agent 160 and peer agent 170, any number of nodes can be supported using the protocol described herein.

Figure 6:
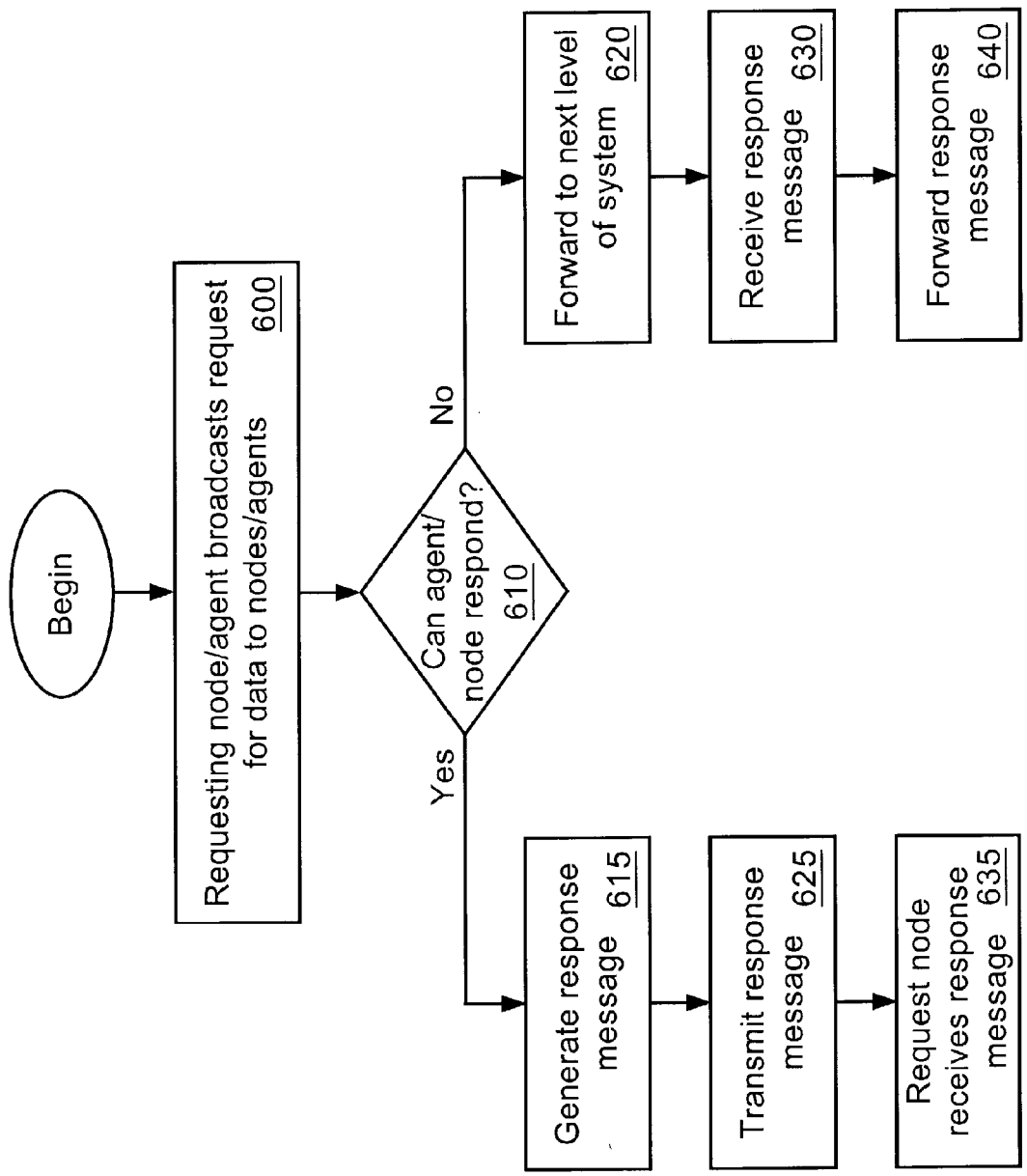
FIG. 6 is a flow diagram of one embodiment of a request for data in a hierarchical system.

FIG. 6 is a flow diagram of one embodiment of a request for data in a hierarchical system. As mentioned above, nodes and agents at each level in a system hierarchy operate in the same manner. Thus, nodes interact with other nodes using the same messages and the same protocols as when interacting with agents that represent multiple nodes.

A requesting node or agent broadcasts a request for data to other nodes and agents in the system, 600. The requesting node/agent can, for example, broadcast a PRIL message with the address of the requested data. When an agent/node receives the request, the agent/node determines whether that agent/node can respond to the request, 610.

In the case of a node/agent receiving the request, the node determines whether that node is a home node for the requested data or if the node is a peer to the requesting node/agent. If the receiving entity is a peer, then the node/agent responds with either an IACK message indicating that the node/agent does not have a valid copy of the requested data, or with a message to provide a copy of the requested data. If the receiving entity is an agent, the agent determines if the agent can respond to the request, for example, using an import cache or an export directory.

If the node/agent can respond to the request a response message is generated, 615. The node/agent transmits the response message to the node/agent from which the request message was received, 625. The requesting node/agent receives the response message, 635. The response message can be further forwarded to lower levels in the system hierarchy if necessary.

If the node/agent cannot respond to the request message, 610, the request message is forwarded to the next higher level in the system hierarchy, 620. In one embodiment, the request message is forwarded to one or more agents that represent other agents and/or nodes within the system. The request message can be further forwarded as necessary until the request message reaches an agent/node that can respond to the request message. The response message corresponding to the request message is received by the transmitting nodes/agents 630 and forwarded down the hierarchy as necessary, 640.

Figure 7:
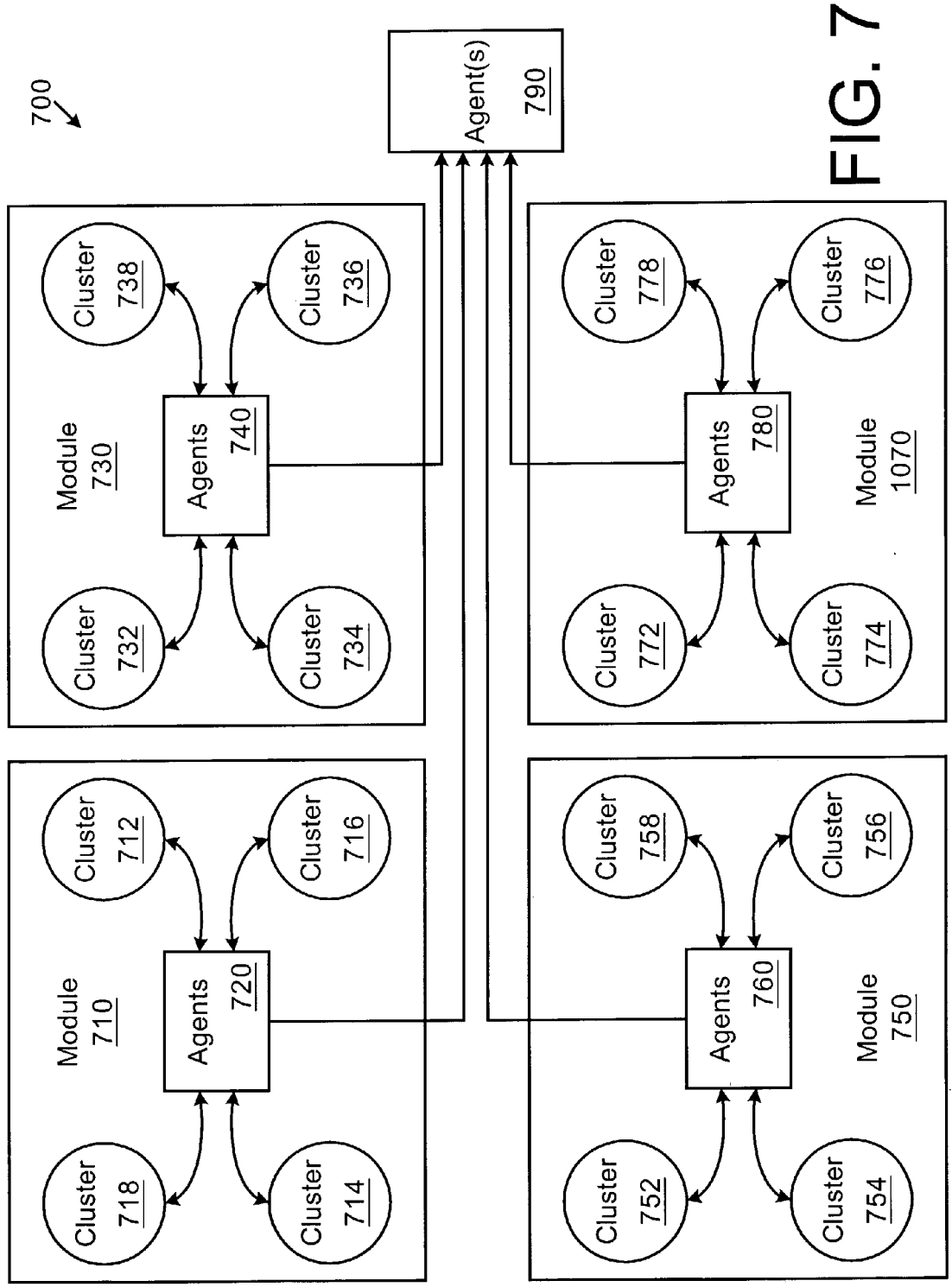
FIG. 7 is a conceptual illustration of a hierarchical system architecture using peer and home agents.

FIG. 7 is a conceptual illustration of a hierarchical system architecture using peer and home agents. System 700 is illustrated with four modules having four clusters each; however, any number of clusters can be included in a module and any number of modules as well as any number of hierarchical layers can be supported.

Module 710 includes clusters 712, 714, 716 and 718, each of which includes multiple nodes, a peer agent and a home agent. FIG. 2a provides an example of a cluster with four nodes. Each cluster is coupled with agents 720. In one embodiment, agents 720 include a peer agent and a home agent to operate in the same manner as the peer agents and the home agents described above. The difference between the agents for the module is that the agents represent multiple clusters rather than the multiple nodes of a cluster.

Module 730 includes clusters 732, 734, 736 and 738 coupled with agents 740. Module 750 includes clusters 752, 754, 756 and 758 coupled with agents 760. Similarly, module 770 includes clusters 772, 774, 776 and 778 coupled with agents 780. Each of modules 710, 730, 750 and 770 is coupled with agents 790.

Figure 8:
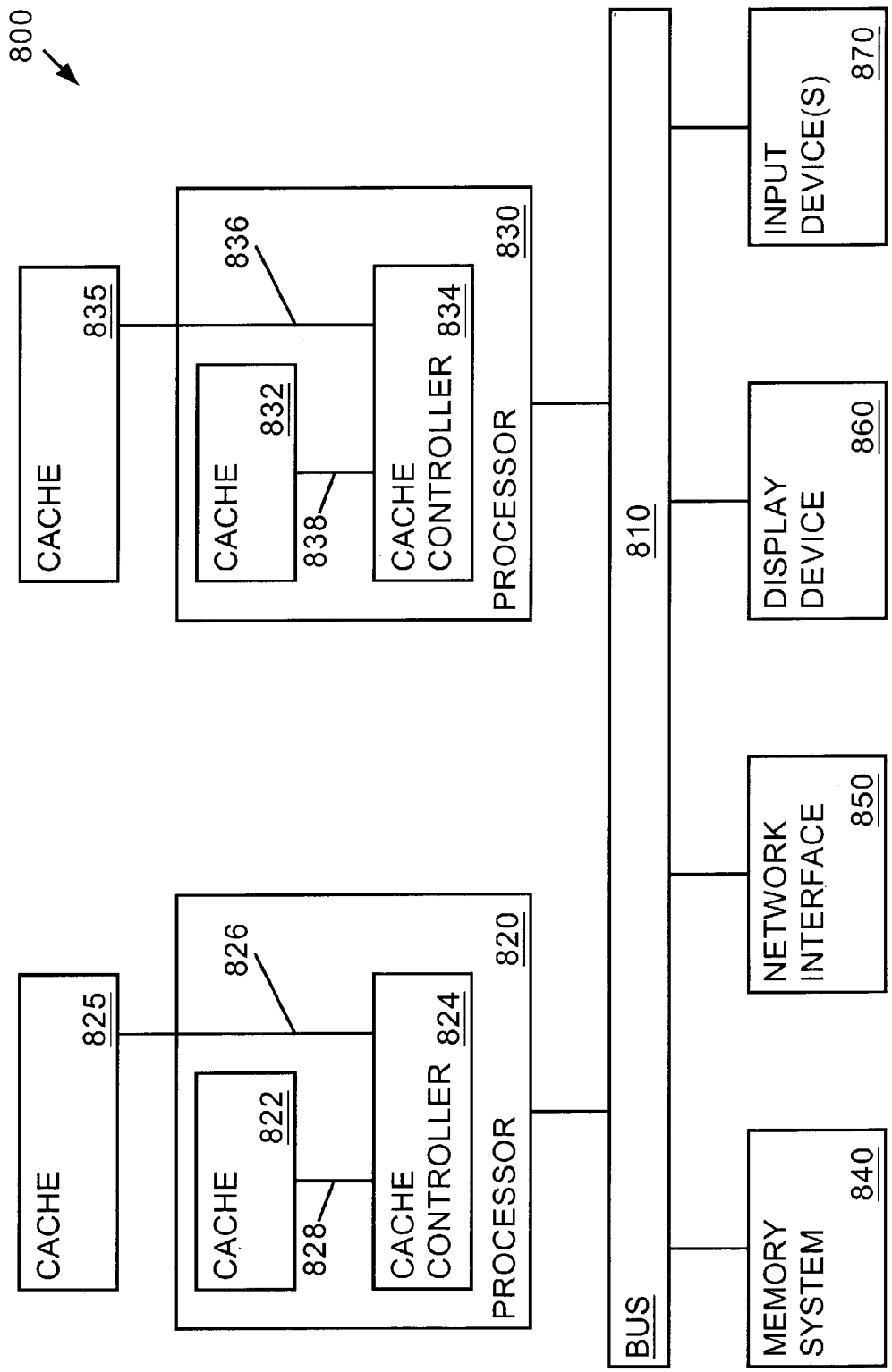
FIG. 8 is one embodiment of a multiprocessor system.

FIG. 8 is one embodiment of a multiprocessor system. Multiprocessor system 800 is intended to represent a range of systems having multiple processors, for example, computer systems, real-time monitoring systems, etc. Alternative multiprocessor systems can include more, fewer and/or different components. In certain situations, the cache management techniques described herein can be applied to both single processor and to multiprocessor systems. Multiprocessor system 800 can be configured to operate as a multi-node system.

Multiprocessor system 800 includes bus system 810 or other communication device(s) to communicate information. Bus system 810 can include any number of buses and associated interconnection circuitry, for example, bus bridges. Processor 820 is coupled with bus system 810 to process information. Processor 820 can include cache memory 822, for example a level zero (L0) cache memory, and cache controller 824. In one embodiment, processor 820 is also coupled with cache 825, which can be any type of cache memory. In an alternate embodiment, cache 825 can be coupled with bus system 810. Other types of processor-cache configurations can also be used.

In one embodiment, cache controller 824 is coupled with cache memory 822 via cache memory interface 828, which can be, for example, a bus internal to processor 820. Cache controller is coupled with cache memory 825 via cache interface 826, which provides an interface between processor 820 and an external cache memory.

Multiprocessor system 800 further includes processor 830 with cache memory 832 and cache controller 834. Cache controller 834 is coupled with cache memory 832 via cache interface 838. Similarly, cache controller 834 is coupled with cache memory 835 via cache interface 836. In one embodiment, cache memory 835 is coupled with processor 830.

While multiprocessor system 800 is illustrated with two processors, multiprocessor system 800 can include any number of processors and/or co-processors. Multiprocessor system 800 further includes memory system 840 coupled with bus system 810. Memory system 840 can include any combination of dynamic (e.g., random access memory) and static (e.g., read-only memory, CD-ROM, disk storage, flash memory) memory devices and associated drives, where appropriate. The memory devices of memory system 840 are used to store information and instructions to be executed by processors of multiprocessor system 800. Memory system 840 also can be used to store temporary variables or other intermediate information during execution of instructions by the processors.

Instructions can be provided to memory system 840 from a static or remote storage device, such as magnetic disk, a read-only memory (ROM) integrated circuit, CD-ROM, DVD, via a remote connection that is either wired or wireless, etc. In alternative embodiments, hard-wired circuitry can be used in place of or in combination with software instructions. Thus, execution of sequences of instructions is not limited to any specific combination of hardware circuitry and software instructions.

Multiprocessor system 800 further includes network interface 850 to provide access to a network, such as a local area network and/or the Internet. Network interface 850 can provide wireless and/or wired network interfaces, which can include communication of instructions to and/or from remote electronically-accessible media. An electronically-accessible medium includes any mechanism that provides (i.e., stores and/or transmits) content (e.g., computer executable instructions) in a form readable by and electronic device (e.g., a computer, a personal digital assistant, a cellular telephone).

For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals).

Multiprocessor system 800 can also include display device 860, such as a cathode ray tube (CRT) or liquid crystal display (LCD), to display information. Input device(s) 870, including, for example, a keyboard having alphanumeric and other keys, is typically coupled to bus 810 to communicate information and command selections to processors 820 and/or 830. Another type of user input device is a cursor control device, such as a mouse, a trackball, or cursor direction keys to communicate direction information and command selections to processors 820 and 830 and to control cursor movement on display device 860.

Figure 9:
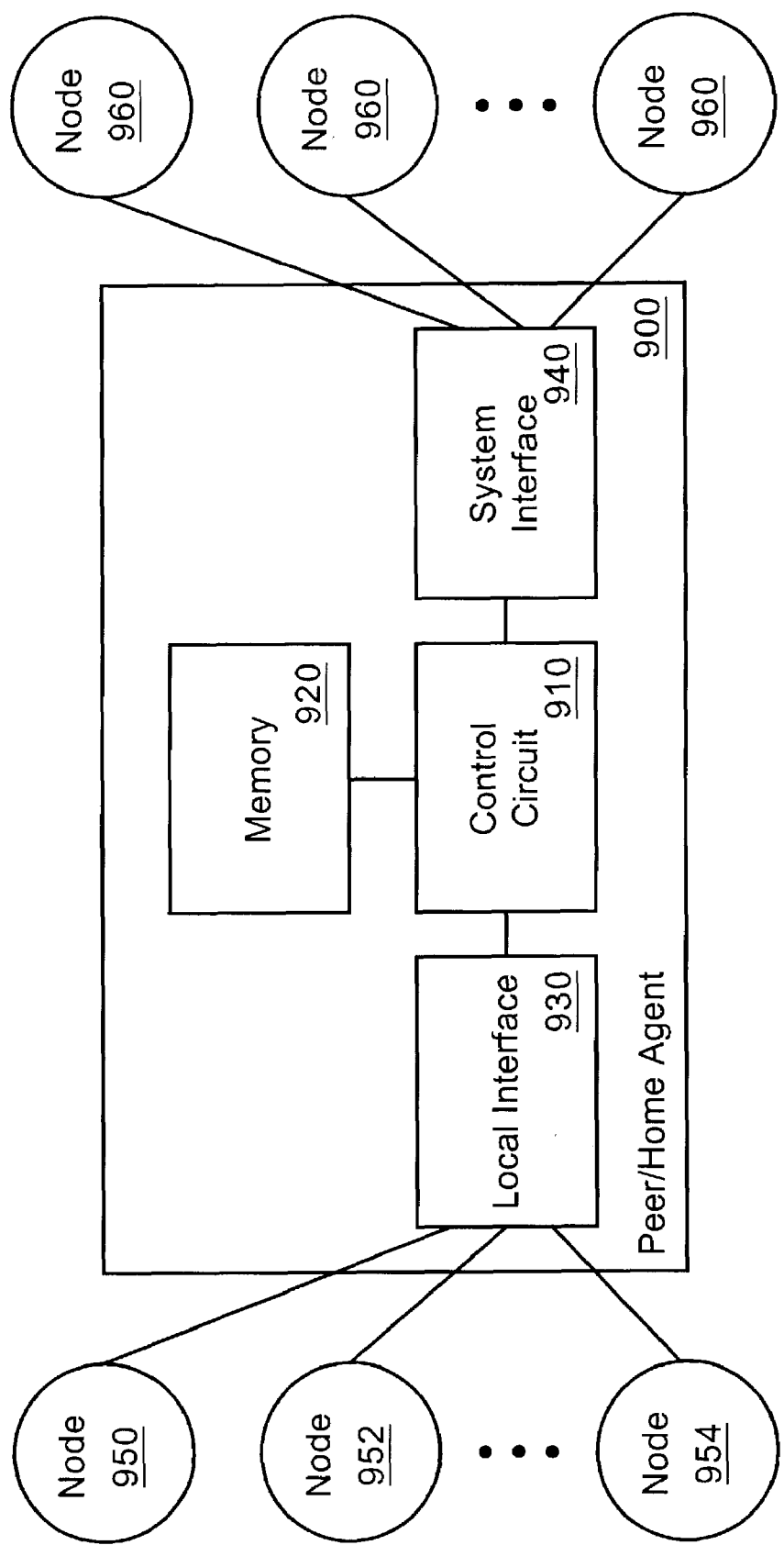
FIG. 9 is a block diagram of one embodiment of an agent.

FIG. 9 is a block diagram of one embodiment of an agent. The agent of FIG. 9 can be a peer agent or a home agent. Also, in an alternative embodiment agent 900 can include additional and/or different components, for example, one or more input/output components.

In general, agent 900 includes control circuit 910 coupled with memory 920, local interface 930 and system interface 940. Local interface 930 is coupled with one or more nodes (e.g., 950, 952, 954) of a cluster. System interface 940 is coupled with one or more nodes or agents (e.g., 960, 962, 964) that are external to the cluster represented by agent 900.

Local interface 930 receives and transmits messages to the nodes of a cluster as described in greater detail above. When messages are received from one or more nodes, local interface 930 passes the messages to control circuit 910, which processes the messages and determines which, if any, external nodes or agents should receive the message. Control circuit 910 can interact with memory 920 to store data for further processing, for example, the node that is a source of a message, or routing tables. The control circuit 910 also interacts with a tracking structure stored in memory 920 that matches returning responses coming in from external nodes or agents with originating requests from local agents and vice versa.

Control circuit 910 sends messages to external agents or nodes through system interface 940 and receives response messages from the agents or nodes also through system interface 940. The response messages are processed by control circuit 910 and sent to the appropriate node(s) through local interface 930.

When messages are received from an external node or agent, the messages are received through system interface 940, processed by control circuit 910 and forwarded to the appropriate node(s) through local interface 930. Response messages from the local node(s) is/are received by local interface 930, processed by control circuit 910 and forwarded to one or more external nodes/agents through system interface 940.

Because agent 900 receives and transmits the same messages in the same manner as the nodes of the local cluster, the remote nodes/agents are transparent to the local nodes. Also, multiple layers of agents can be used, as illustrated in FIG. 10, to provide a system having any number of nodes in which each node is configured to operate with a predetermined number of other nodes or agents.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
    a first plurality of nodes, each node having at least a cache memory, wherein the nodes are coupled together and interact according to a predetermined cache coherency protocol;
    a peer agent having a control circuit and memory coupled with the first plurality of nodes to represent a second plurality of nodes coupled with the peer agent, wherein the first plurality of nodes interact with the peer agent using the predetermined cache coherency protocol; and
    a home agent coupled with the first plurality of nodes to represent at least one remote node, wherein each of the first plurality of nodes operates as a home node, an address of a cache line of the cache memory is used to designate the home node, selectively store data corresponding to a predetermined range in non-cache memory such that the home node for requested data having an address within the respective predetermined range provides a copy of the requested data from non-cache memory if a valid, cached copy of the requested data is not available.

2. The apparatus of claim 1 wherein a node comprises:
    a processor;
    at least one cache memory coupled with the processor; and
    non-cache memory coupled with the processor.

3. The apparatus of claim 1 wherein the home agent represents a plurality of remote nodes that operate as home nodes for respective predetermined ranges of addresses to selectively store data corresponding to the predetermined ranges in non-cache memories and further wherein, wherein the first plurality of nodes interact with the home agent using the predetermined cache coherency protocol.

4. An apparatus comprising:
    a first plurality of nodes, each node having at least a cache memory, wherein the nodes are coupled together and interact according to a predetermined cache coherency protocol; and
    means for representing a second plurality of nodes with a peer agent having at least a memory, the peer agent coupled with the first plurality of nodes, wherein the first plurality of nodes interact with the second plurality of nodes using the predetermined cache coherency protocol, wherein each of the first plurality of nodes operates as a home node, an address of a cache line of the cache memory is used to designate the home node, selectively store data corresponding to a predetermined range in non-cache memory such that the home node for requested data having an address within the respective predetermined range provides a copy of the requested data from non-cache memory if a valid, cached copy of the requested data is not available.

5. The apparatus of claim 4 wherein at least one of the second plurality of nodes comprises an agent.

* * * * *

UNITED STATES PATENT AND TRADEMARK OFFICE
CERTIFICATE OF CORRECTION

| | |
|---|---|
| PATENT NO. | : 7,111,128 B2 |
| APPLICATION NO. | : 10/324711 |
| DATED | : September 19, 2006 |
| INVENTOR(S) | : Hum et al. |

It is certified that error appears in the above-identified patent and that said Letters Patent is hereby corrected as shown below:

In column 12, at line 30, delete "and" and insert --an--.

Signed and Sealed this

Twenty-seventh Day of November, 2007

JON W. DUDAS
*Director of the United States Patent and Trademark Office*